United States Patent
Bala et al.

(10) Patent No.: US 11,770,220 B2
(45) Date of Patent: Sep. 26, 2023

(54) PHY LAYER MULTIPLEXING OF DIFFERENT TYPES OF TRAFFIC IN 5G SYSTEMS

(71) Applicant: InterDigital Patent Holdings, Inc., Wilmington, DE (US)

(72) Inventors: Erdem Bala, East Meadow, NY (US); Alphan Sahin, Westbury, NY (US); Moon-il Lee, Melville, NY (US); Mihaela C. Beluri, Jericho, NY (US); Rui Yang, Greenlawn, NY (US); Janet A. Stern-Berkowitz, Little Neck, NY (US); Fengjun Xi, San Diego, CA (US); Afshin Haghighat, Ile-Bizard (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 12 days.

(21) Appl. No.: 17/171,499

(22) Filed: Feb. 9, 2021

(65) Prior Publication Data
US 2021/0167905 A1 Jun. 3, 2021

Related U.S. Application Data

(63) Continuation of application No. 16/090,767, filed as application No. PCT/US2017/026506 on Apr. 7, 2017, now abandoned.
(Continued)

(51) Int. Cl.
*H04W 84/04* (2009.01)
*H04L 5/00* (2006.01)
*H04J 11/00* (2006.01)

(52) U.S. Cl.
CPC .......... *H04L 5/0007* (2013.01); *H04J 11/00* (2013.01); *H04L 5/0048* (2013.01); *H04L 5/0091* (2013.01); *H04W 84/042* (2013.01)

(58) Field of Classification Search
CPC . H04L 5/0007; H04L 27/3488; H04L 5/0048; H04L 5/0091; H04L 1/0045;
(Continued)

(56) References Cited

U.S. PATENT DOCUMENTS 9,326,277 B2   4/2016   Heo et al.
9,357,420 B2   5/2016   Ahn et al.
(Continued)

FOREIGN PATENT DOCUMENTS

CN   102150380 A   8/2011
CN   102415038 A   4/2012
(Continued)

OTHER PUBLICATIONS

3rd Generation Partnership Project (3GPP), R1-1608814, "DL Control Channel Related to Multiplexing eMBB and URLLC", Fujitsu, 3GPP TSG RAN WG1 Meeting #86bis, Lisbon, Portugal, Oct. 10-14, 2016, pp. 1-4.
(Continued)

*Primary Examiner* — Chi Ho A Lee
(74) *Attorney, Agent, or Firm* — Flaster Greenberg, P.C.

(57) ABSTRACT

Systems, methods, and instrumentalities are disclosed for physical (PHY) layer multiplexing of different types of traffic in 5G systems. A device may receive a communication. The communication may include a first traffic type. The device may monitor the communication for an indication that the communication includes a second traffic type that is multiplexed with and/or punctures the first traffic type. An indicator received in the communication and detected by the monitoring may indicate where the second traffic type is
(Continued)

located in the communication. The first traffic type and the second traffic type may be multiplexed at a resource element (RE) level. For example, a first traffic type may be punctured by a second traffic type at the RE level. The device may decode one or more of the first or second traffic types in the communication based on the indication.

16 Claims, 32 Drawing Sheets

Related U.S. Application Data

(60) Provisional application No. 62/373,140, filed on Aug. 10, 2016, provisional application No. 62/320,080, filed on Apr. 8, 2016.

(58) Field of Classification Search
CPC .............. H04L 5/0053; H04L 1/0041; H04W 72/1263; H04W 84/042; H04J 11/00
See application file for complete search history.

(56) References Cited

U.S. PATENT DOCUMENTS

| | | | |
|---|---|---|---|
| 9,374,211 B2 | 6/2016 | Kim et al. | |
| 2011/0110316 A1 | 5/2011 | Chen | |
| 2013/0021948 A1 | 1/2013 | Moulsley | |
| 2014/0133427 A1 | 5/2014 | Kim | |
| 2014/0307676 A1 | 10/2014 | Heo et al. | |
| 2015/0043455 A1 | 2/2015 | Miklos et al. | |
| 2015/0334685 A1 | 11/2015 | Ji et al. | |
| 2016/0043849 A1 | 2/2016 | Lee | |
| 2016/0142898 A1 | 5/2016 | Poitau et al. | |
| 2016/0302092 A1 | 10/2016 | Sartori et al. | |
| 2016/0345311 A1* | 11/2016 | Chen | H04L 5/00 |
| 2016/0380742 A1 | 12/2016 | Suzuki et al. | |
| 2017/0019882 A1 | 1/2017 | Nimbalker et al. | |
| 2017/0041904 A1 | 2/2017 | Suzuki et al. | |
| 2017/0135116 A1 | 5/2017 | Kuchibhotla et al. | |
| 2017/0223677 A1* | 8/2017 | Dinan | H04W 72/0446 |
| 2017/0251463 A1 | 8/2017 | Kwak et al. | |
| 2017/0285130 A1* | 10/2017 | Kim | H04L 1/1812 |
| 2017/0310431 A1 | 10/2017 | Iyer et al. | |
| 2017/0332359 A1 | 11/2017 | Tsai et al. | |
| 2017/0359807 A1 | 12/2017 | Hong et al. | |
| 2018/0041225 A1 | 2/2018 | Park et al. | |
| 2018/0063865 A1 | 3/2018 | Islam et al. | |
| 2018/0069622 A1* | 3/2018 | Cheng | H04B 7/26 |
| 2018/0070341 A1 | 3/2018 | Islam et al. | |
| 2018/0092104 A1 | 3/2018 | Sheng et al. | |
| 2018/0098358 A1 | 4/2018 | Rico Alvarino et al. | |
| 2018/0184413 A1 | 6/2018 | Rong et al. | |
| 2018/0220425 A1* | 8/2018 | Zhang | H04W 88/10 |
| 2018/0317198 A1 | 11/2018 | Lee et al. | |
| 2018/0343667 A1 | 11/2018 | Li et al. | |
| 2019/0075580 A1 | 3/2019 | Chen et al. | |
| 2019/0150029 A1* | 5/2019 | Zhang | H04L 1/0013 375/260 |
| 2019/0165906 A1 | 5/2019 | Bala et al. | |
| 2019/0191443 A1 | 6/2019 | Sano et al. | |
| 2019/0281609 A1 | 9/2019 | Kowalski et al. | |
| 2019/0288801 A1 | 9/2019 | Yang et al. | |
| 2019/0320450 A1 | 10/2019 | Li et al. | |
| 2021/0167905 A1 | 6/2021 | Bala | |

FOREIGN PATENT DOCUMENTS

| | | |
|---|---|---|
| CN | 102823313 A | 12/2012 |
| CN | 103168441 A | 6/2013 |
| CN | 103650447 A | 3/2014 |
| CN | 105075170 A | 11/2015 |
| CN | 105979597 A | 9/2016 |
| EP | 1293056 A1 | 3/2003 |
| EP | 2186362 A1 | 5/2010 |
| JP | 2018-511203 A | 4/2018 |
| JP | 6795616 B2 | 11/2020 |
| RU | 2480911 C2 | 4/2013 |
| WO | WO 01/93479 A1 | 12/2001 |
| WO | WO 2009-02098 | 2/2009 |
| WO | WO 2009/020983 A1 | 2/2009 |
| WO | WO 2015/179136 A1 | 11/2015 |
| WO | 2016/123393 A1 | 8/2016 |
| WO | 2017177083 A1 | 10/2017 |

OTHER PUBLICATIONS

3rd Generation Partnership Project (3GPP), R1-1608942, "Multiplexing eMBB and URLLC Transmissions", Sony, 3GPP TSG RAN WG1 Meeting #86bis, Lisbon, Portugal, Oct. 10-14, 2016, 4 pages.
3rd Generation Partnership Project (3GPP), R1-1608957, "URLLC and eMBB Frame Structure and Multiplexing", ZTE, ZTE Microelectronics, 3GPP TSG-RAN WG1 Meeting #86bis, Lisbon, Portugal, Oct. 10-14, 2016, pp. 1-7.
3rd Generation Partnership Project (3GPP), R1-1609059, "Multiplexing URLLC and eMBB in DL", Samsung, 3GPP TSG RAN WG1 Meeting #86bis, Lisbon, Portugal, Oct. 10-14, 2016, pp. 1-5.
3rd Generation Partnership Project (3GPP), TS 36.211 V11.4.0, "Technical Specification Group Radio Access Network, Evolved Universal Terrestrial Radio Access (E-UTRA), Physical Channels and Modulation (Release 11)", Sep. 2013, pp. 1-120.
3rd Generation Partnership Project (3GPP), TS 36.212 V13.3.0, "Technical Specification Group Radio Access Network, Evolved Universal Terrestrial Radio Access (E-UTRA), Multiplexing and Channel Coding (Release 13)", Sep. 2016, pp. 1-140.
3rd Generation Partnership Project (3GPP), TS 36.213 V11.4.0, "Technical Specification Group Radio Access Network, Evolved Universal Terrestrial Radio Access (E-UTRA), Physical Layer Procedures (Release 11)", Sep. 2013, pp. 1-182.
3rd Generation Partnership Project (3GPP), R1-162206, "Frame Structure Requirements", Qualcomm Incorporated, 3GPP TSG-RAN WG1 #84b, Busan, Korea, Apr. 11-15, 2016, pp. 1-9.
3rd Generation Partnership Project (3GPP), R1-162922, "Discussion on Multiple Access for New Radio Systems", InterDigital Communications, 3GPP TSG-RAN WG1 Meeting #84bis, Busan, Korea, Apr. 11-15, 2016, pp. 1-4.
3rd Generation Partnership Project (3GPP), R1-1706054, "Performance Evaluation of DL eMBB/URLLC Multiplexing", Ericsson, 3GPP TSG-RAN WG1 Meeting #88bis, Spokane, U.S., Apr. 3-7, 2017, pp. 1-5.
3rd Generation Partnership Project (3GPP), TR 36.859 V13.0.0, "Technical Specification Group Radio Access Network, Study on Downlink Multiuser Superposition Transmission (MUST) for LTE (Release 13)", Dec. 2015, 48 pages.
3rd Generation Partnership Project (3GPP), TR 38.913 V0.3.0, "Technical Specification Group Radio Access Network, Study on Scenarios and Requirements for Next Generation Access Technologies (Release 14)", Mar. 2016, 30 pages.
Dai et al., "Non-Orthogonal Multiple Access for 5G: Solutions, Challenges, Opportunities and Future Research Trends", Software Defined 5G Networks For Anything As A Service, IEEE Communications Magazine, Sep. 2015, pp. 74-81.
ITU-R, "IMT Vision—Framework and Overall Objectives of the Future Development of IMT for 2020 and Beyond", Recommendation ITU-R M.2083-0, M Series, Mobile, Radiodetermination, Amateur and Related Satellite Services, Sep. 2015, 21 pages.
Jin et al., "Bit Division Multiplexing for Broadcasting", IEEE Transactions on Broadcasting, vol. 59, No. 3, Sep. 2013, pp. 539-547.
3rd Generation Partnership Project (3GPP), R1-162590, "Consideration on Multiplexing of Non-sTTI and sTTI in the Same Carrier", Huawei, HiSilicon, 3GPP TSG RAN WG1 Meeting #84bis, Busan, Korea, Apr. 11-15, 2016, 4 pages.
Wu et al / "Design and Simulation of Real-time Schedule Model for Embedded Software" Computer Engineering, No. 15, 2010.

(56) References Cited

OTHER PUBLICATIONS

Yan et al / "Real-time scheduling design of SCADA based on validity period of data" Computer Engineering and Applications, No. 01, Jan. 1, 2009.

* cited by examiner

PHY LAYER MULTIPLEXING OF DIFFERENT TYPES OF TRAFFIC IN 5G SYSTEMS

CROSS-REFERENCE TO RELATED APPLICATIONS

This application is a continuation of U.S. Non-Provisional application Ser. No. 16/090,767, filed Oct. 2, 2018, which is the National Stage entry under 35 U.S.C. § 371 of Patent Cooperation Treaty Application PCT/US2017/026506, filed Apr. 7, 2017, which claims the benefit of U.S. Provisional Application Ser. No. 62/320,080 filed Apr. 8, 2016 and U.S. Provisional Application Ser. No. 62/373,140 filed Aug. 10, 2016, the contents of which are incorporated by reference herein and this application claims benefit of the filing date of these priority applications.

BACKGROUND

With applications emerging for cellular technology, the importance of supporting higher data rates, lower latency, and/or massive connectivity will likely continue to increase. For example, support for enhanced Mobile BroadBand (eMBB) communications and/or Ultra-Reliable and Low-Latency Communications (URLLC) has been recommended by the ITU, along with example usage scenarios and desirable radio access capabilities. With a broad range of applications and usage scenarios, radio access capabilities may differ in importance across the range. For example, for eMBB, spectral efficiency, capacity, user data rates (e.g., peak and/or average), and/or mobility may be of high importance. For URLLC, user plane latency and/or reliability may be of high importance. When multiple applications with differing goals are supported, developing effective means for multiplexing these applications and their users in a radio access network may become increasingly important.

SUMMARY

One or more example embodiments as described more fully below provide apparatuses, functions, procedures, processes, execution of computer program instructions tangibly embodying a computer readable memory, functions and operation of methods for one or more of the following. Systems, methods, and instrumentalities are disclosed for physical (PHY) layer multiplexing of different types of traffic in a wireless communication system, such as a 5G system. In examples, a device (e.g., a WTRU) may receive a communication, e.g., from a network. The communication may include a first traffic type (e.g., non-latency constrained traffic). The WTRU may monitor the communication for an indication that the communication includes a second traffic type (e.g., low latency traffic) that is multiplexed with and/or punctures the first traffic type. The monitoring may be a monitoring of a control channel associated with the communication. The WTRU may monitor a location of the communication for the indication. For example, the WTRU may monitor for the indication at the end of the communication, at a symbol, and/or at a subcarrier, etc. An indicator received in the communication and detected by the monitoring may indicate (e.g., include information that indicates) where the second traffic type is located in the communication. The first traffic type and the second traffic type may be multiplexed at a resource element (RE) level. For example, a first traffic type may be punctured by a second traffic type at the RE level. One or more puncturing patterns may be used. The WTRU may decode one or more of the first or second traffic types in the communication based on the indication.

A transmitter (e.g., a transmitting WTRU) may receive low latency data for transmission. The low latency data may include ultra-reliable and low-latency (URLLC) data. The transmitter may allocate a pool of resources for the low latency data. The pool of resources may include one or more resources for nominal data. A low latency reference signal associated with the low latency data may be transmitted. The transmitter may select one or more time and/or frequency resources from the pool or resources for transmission of the low latency data. The transmitter may send the low latency data using the selected resources. The low latency data transmission may be punctured, for example, to avoid the one or more resources for nominal data. The transmitter may align a reference symbol of the low latency data with a reference symbol of nominal data.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
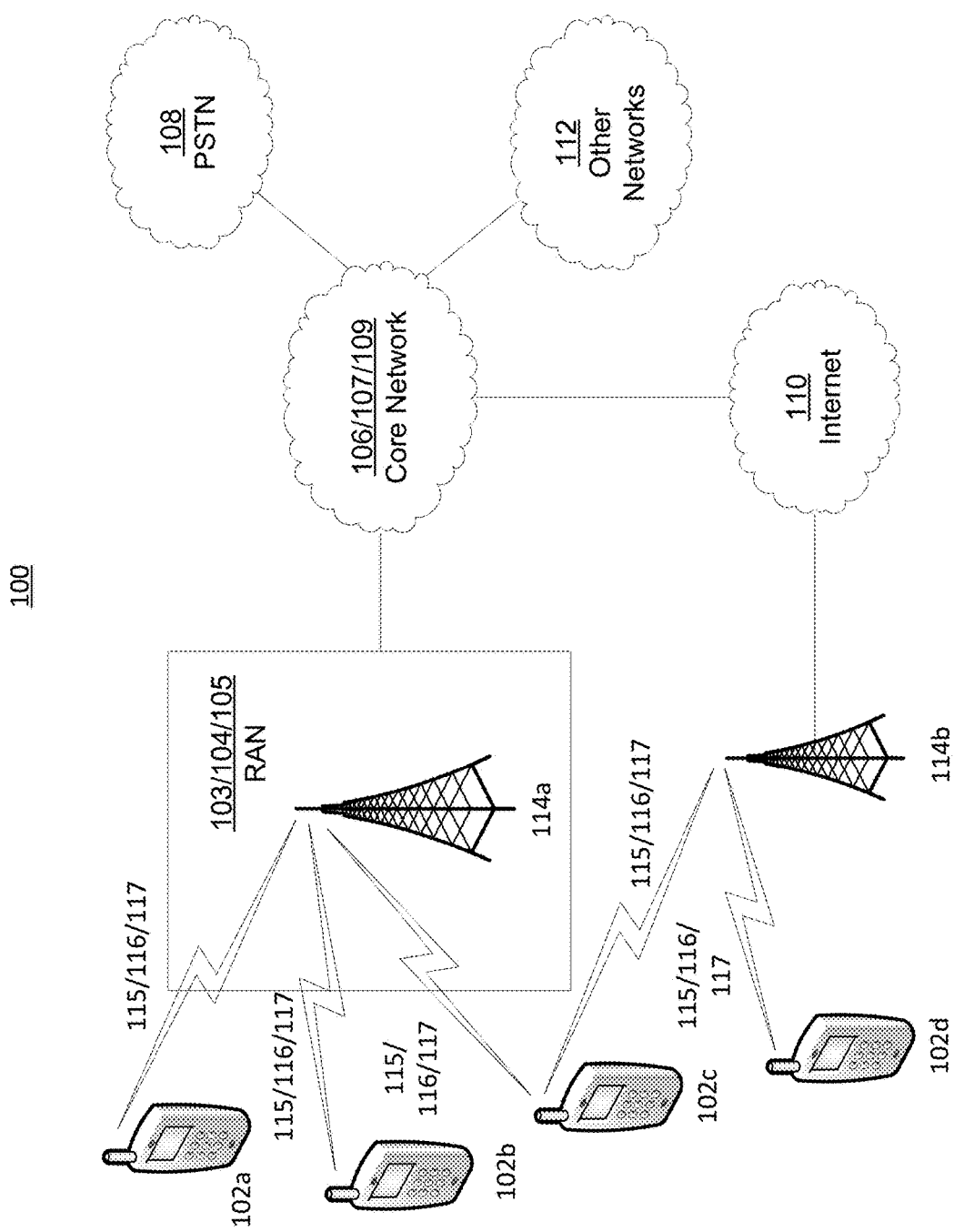
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, e.g., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
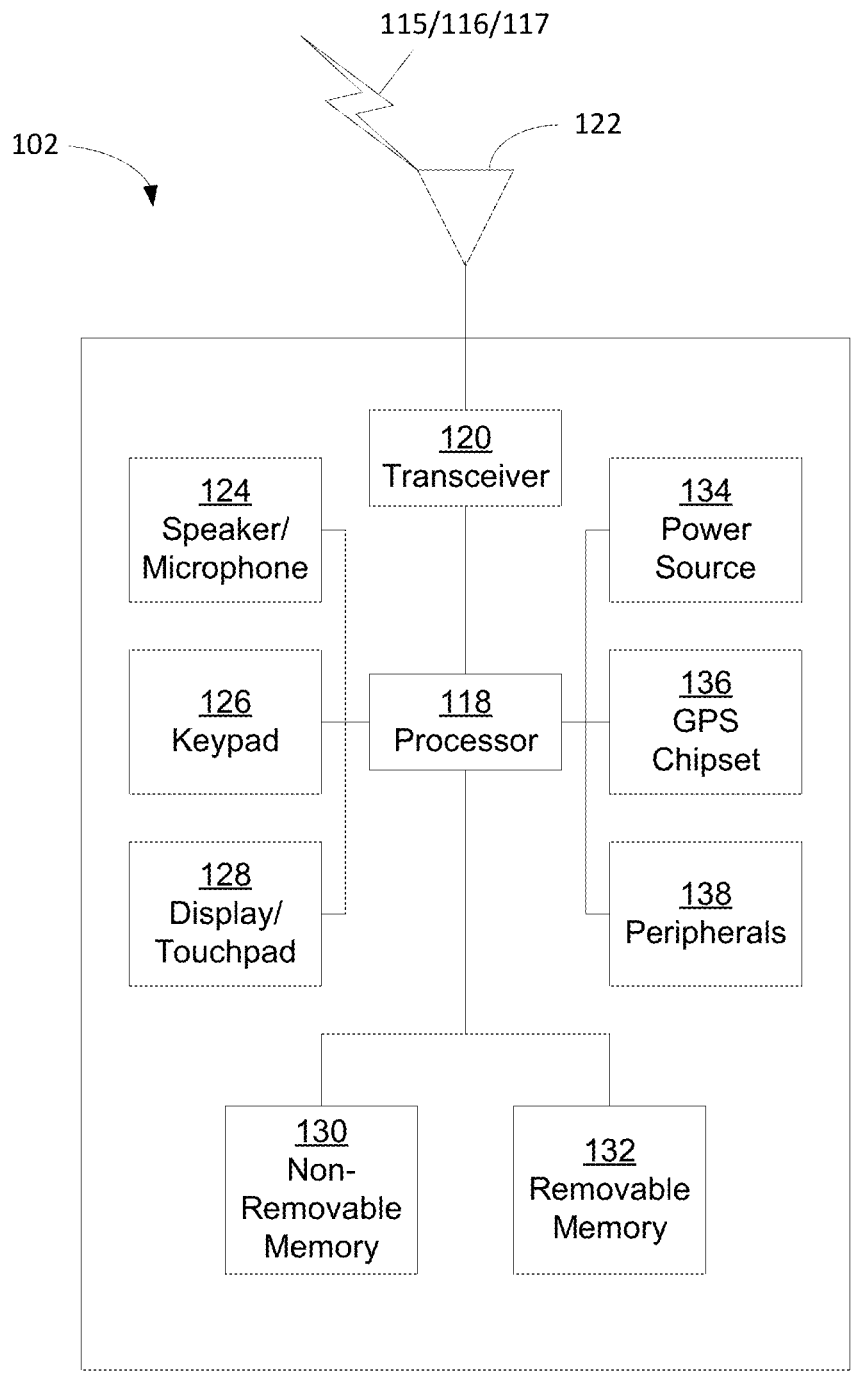
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
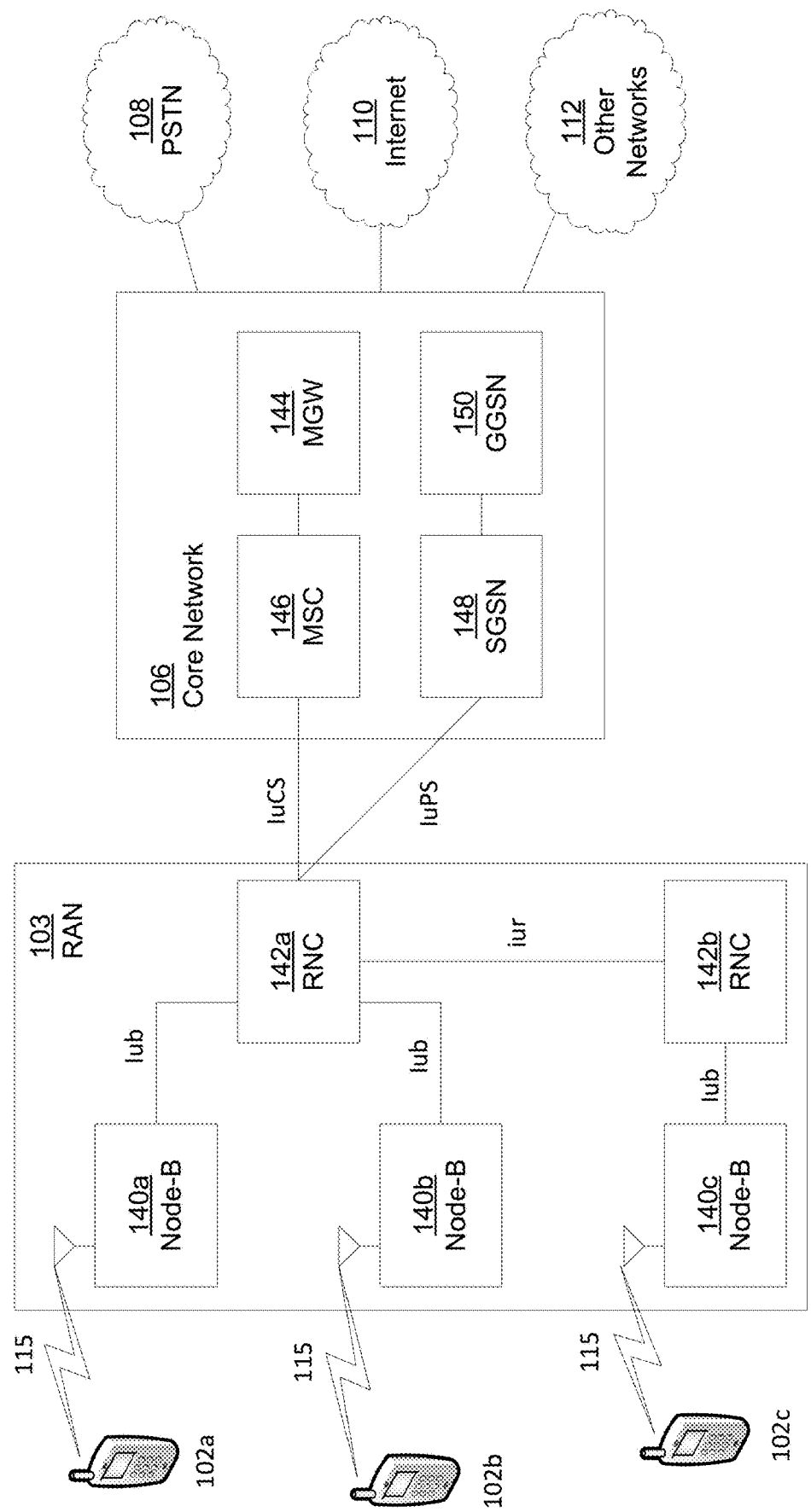
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
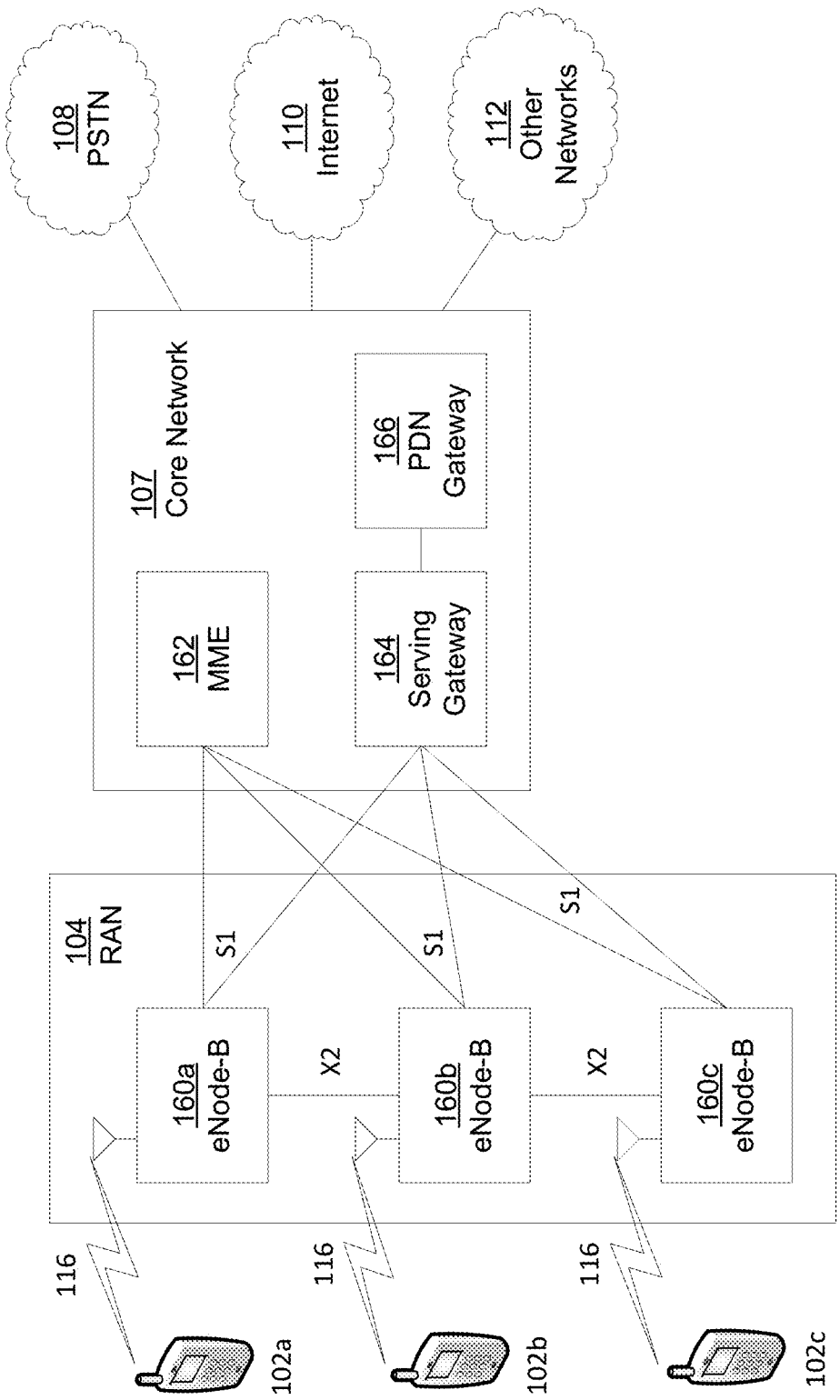
FIG. 1D is a system diagram of another example radio access network and an example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
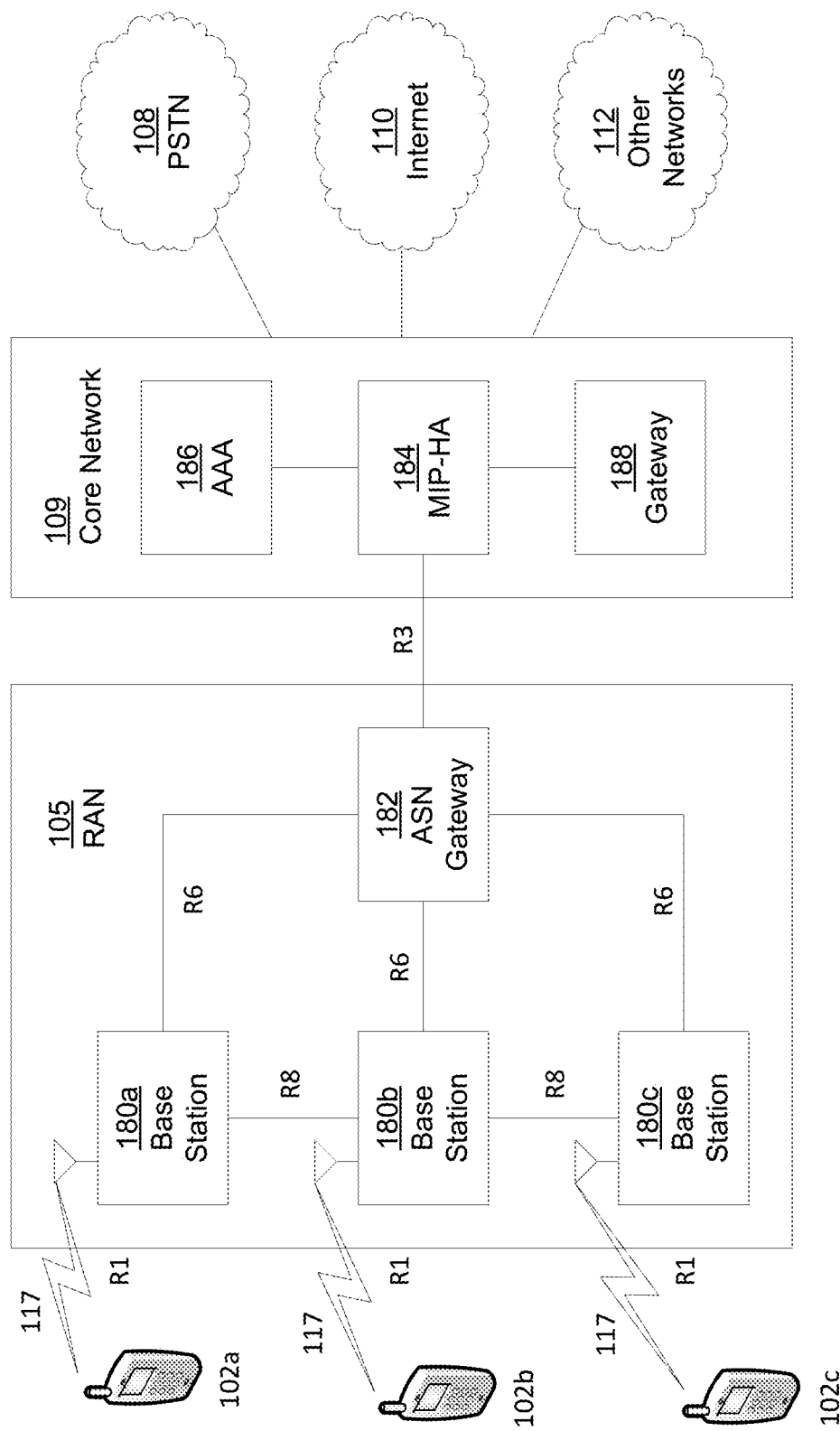
FIG. 1E is a system diagram of another example radio access network and an example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Non-orthogonal multiple access (NOMA) may address challenges of wireless communications, such as high spectral efficiency and/or massive connectivity. NOMA may allocate non-orthogonal resources to users.

NOMA may include multiplexing users in the power-domain. Different users may be allocated different power levels. For example, the different users may be allocated different power levels based on their channel conditions. Different users that may use different power levels may be allocated and/or use the same resources (e.g., in time and/or frequency). Successive interference cancellation (SIC) may be used at the receiver, for example to cancel the interference associated with the different users being allocated and/or using the same resources.

NOMA may include multiplexing users in the code-domain. For example, two or more different users may be assigned different codes. The two or more different users may be multiplexed over the same time-frequency resources.

A multi-user superposition transmission (MUST) may include a power-domain NOMA. MUST may include transmitting data to two or more WTRUs on the same resources. For example, an eNB may transmit to two or more WTRUs on the same resources. A first WTRU of the two or more WTRUs may be located closer to the eNB and may be referred to as a "MUST Near-WTRU". A second WTRU of the two or more WTRUs may be located farther (e.g., far) from the eNB, and may be referred to as a "MUST Far-WTRU". There may be one or more types (e.g., categories) of MUST.

Figure 2:
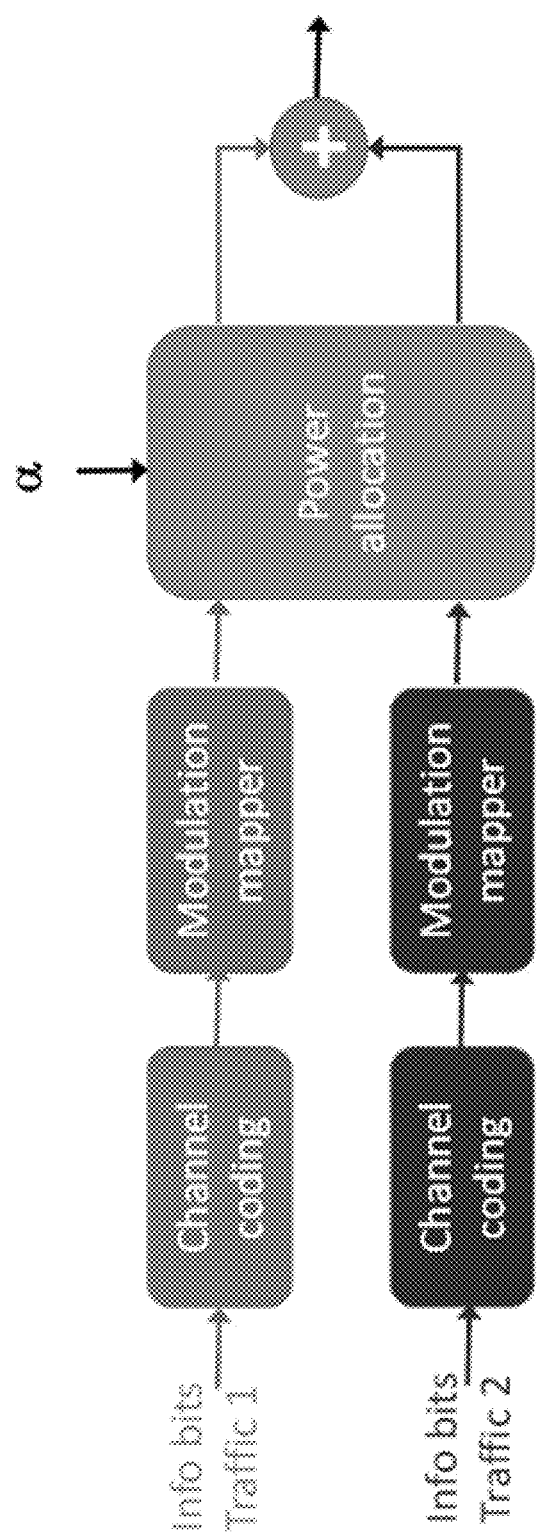
FIG. 2 depicts an example transmitter block diagram for a multi-user superposition transmission (MUST) type.
Figure 3:
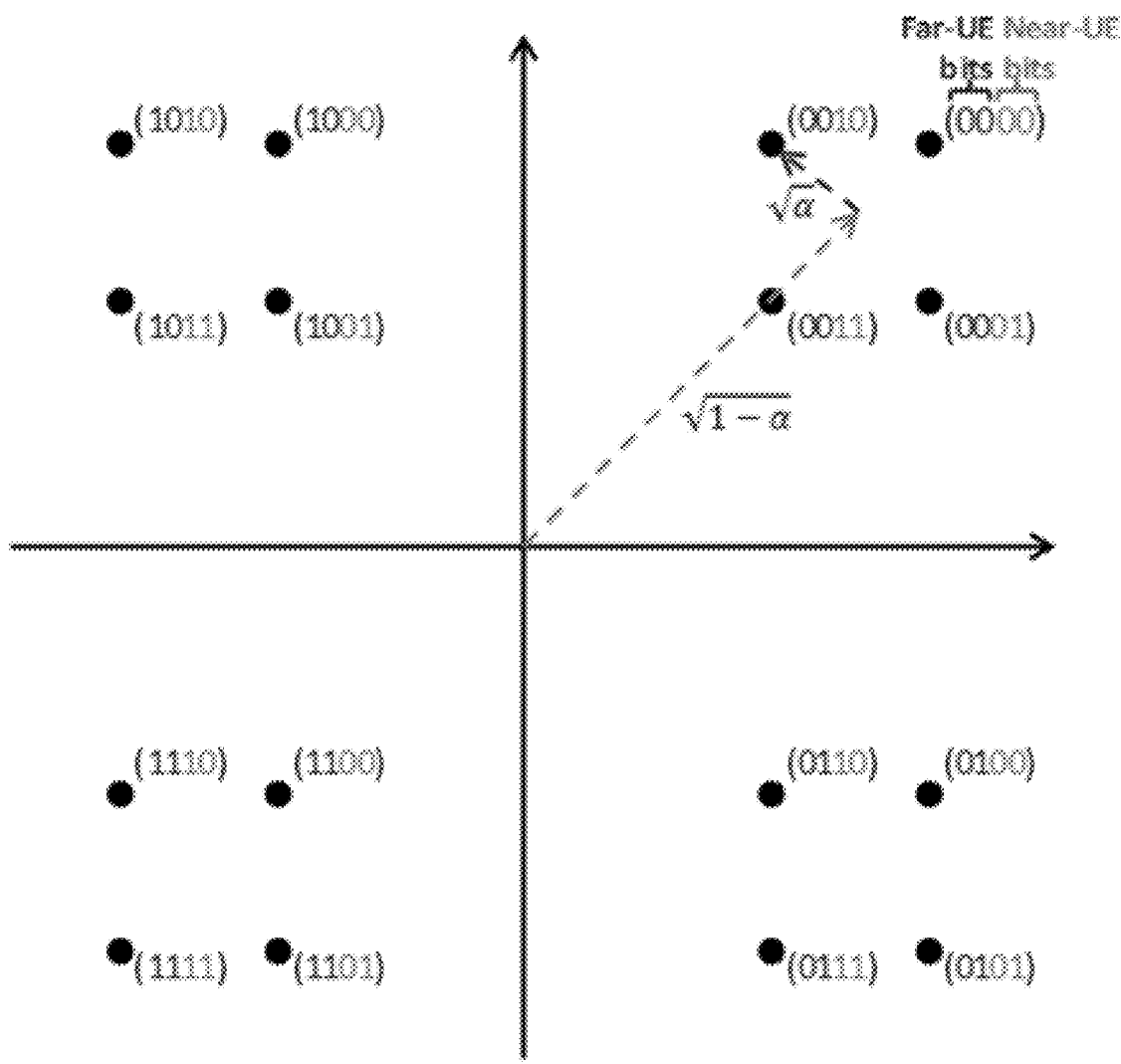
FIG. 3 depicts an example composite constellation for a MUST type.

For example, in a first MUST type (e.g., MUST Category 1), one or more bits of co-scheduled WTRUs may be passed through independent coding chains. The independent coding chains may include one or more of coding, rate matching, and/or scrambling. The one or more coded bits of the co-scheduled WTRUs may be independently mapped to one or more modulation symbols. The one or more modulation symbols of a MUST-near WTRU may be scaled by $\sqrt{\alpha}$. The one or more modulation symbols of a MUST-far WTRU may be scaled by $\sqrt{1-\alpha}$. FIG. 2 depicts an example transmitter block diagram for the first MUST type. FIG. 3 depicts an example composite constellation for the first MUST type.

For example, in a second MUST type (e.g., MUST Category 2), the one or more coded bits of the co-scheduled WTRUs may be jointly mapped to component constellations, for example with an adaptive power ratio. The one or more modulation symbols of the MUST-near WTRU may depend on the one or more coded bits of the MUST-near WTRU and/or the MUST-far WTRU.

Figure 4:
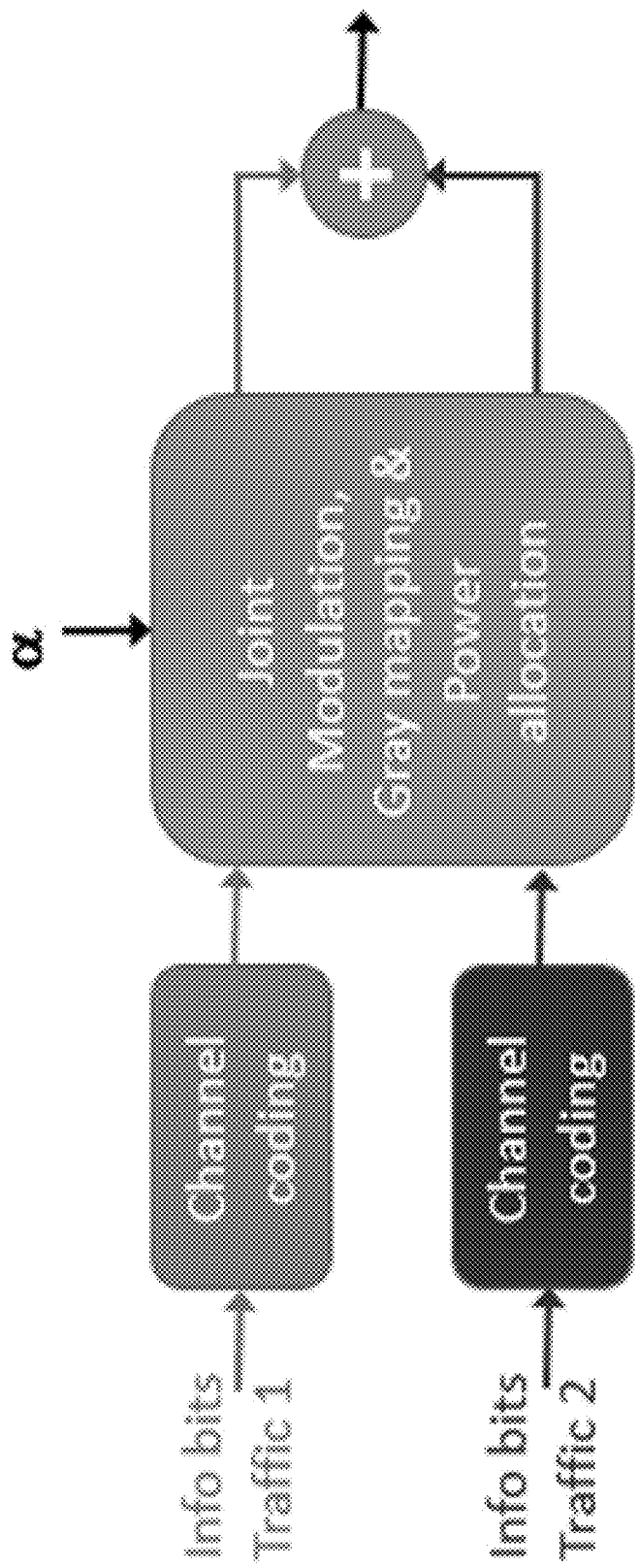
FIG. 4 depicts an example transmitter block diagram for a MUST type.
Figure 5:
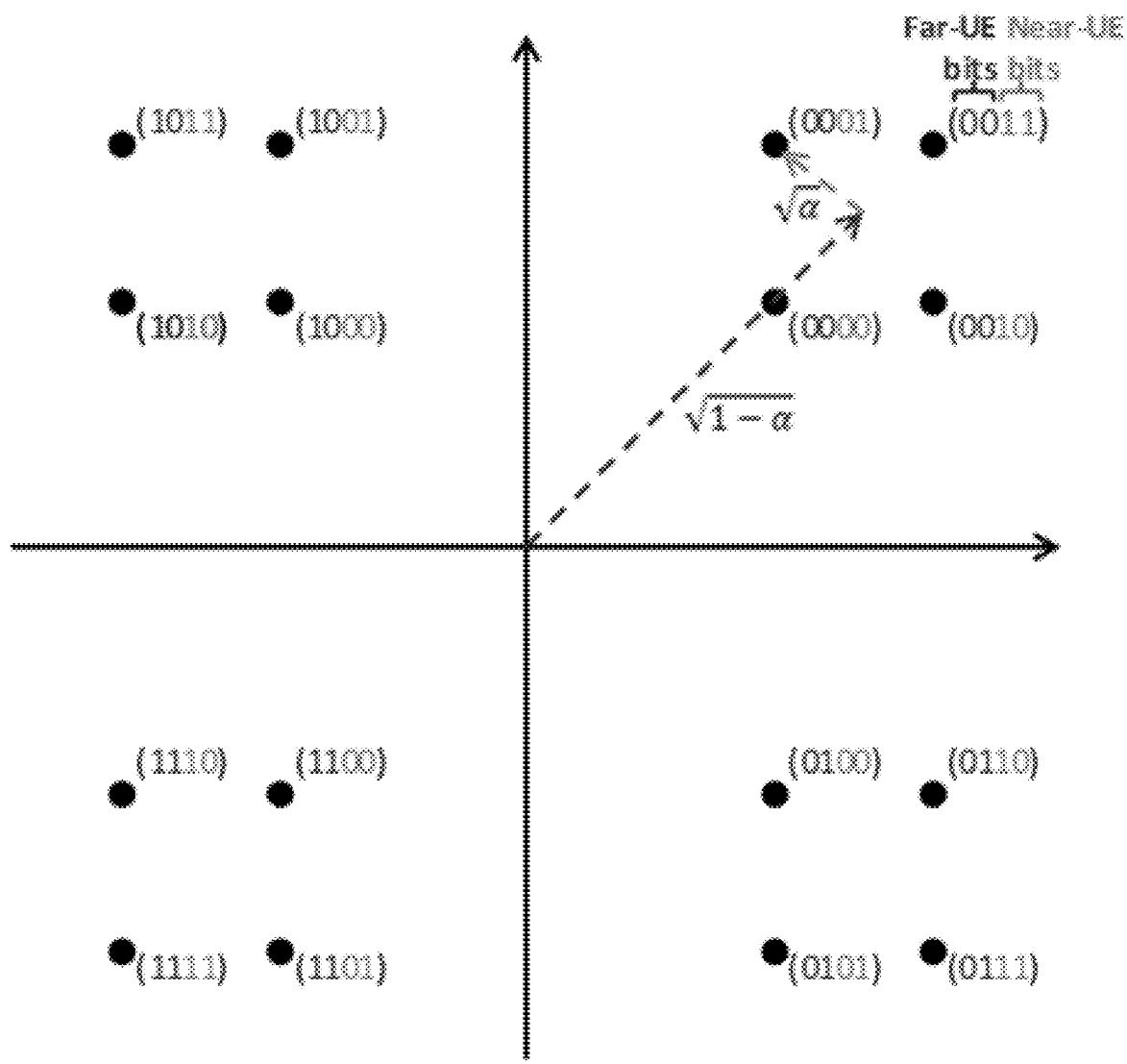
FIG. 5 depicts an example composite constellation for a MUST type.

FIG. 4 depicts an example transmitter block diagram for the second MUST type. FIG. 5 depicts an example composite constellation for the second MUST type.

Figure 6:
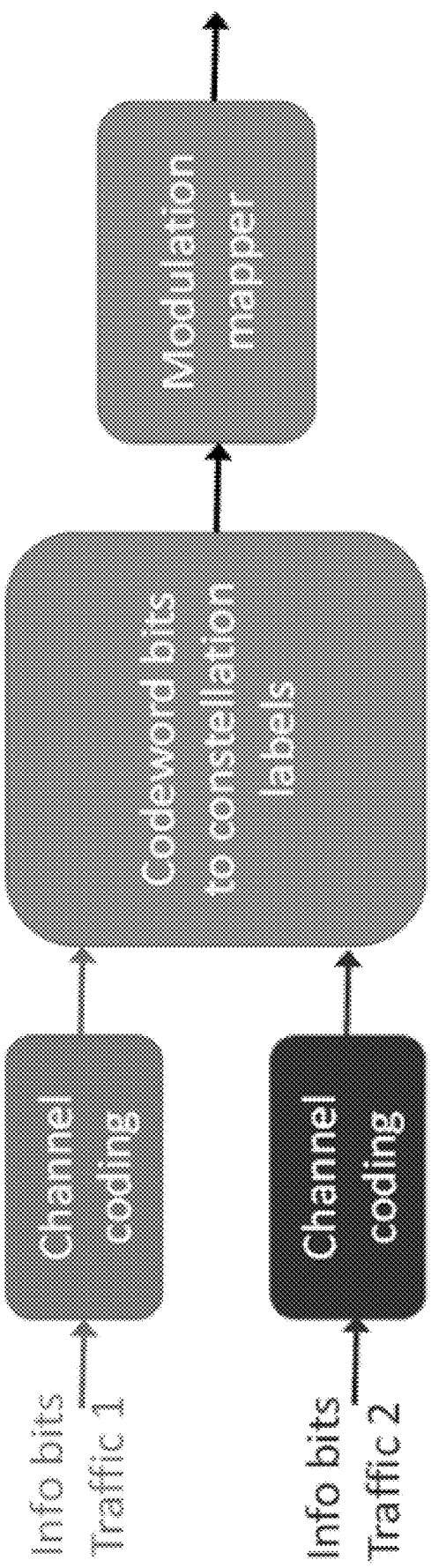
FIG. 6 depicts an example transmitter block diagram for a MUST type.

For example, in a third MUST type (e.g., Category 3), the one or more coded bits of the co-scheduled WTRUs may be superposed (e.g., directly) on the one or more symbols of the composite constellation. FIG. 6 depicts an example transmitter block diagram for the third MUST type.

Figure 7:
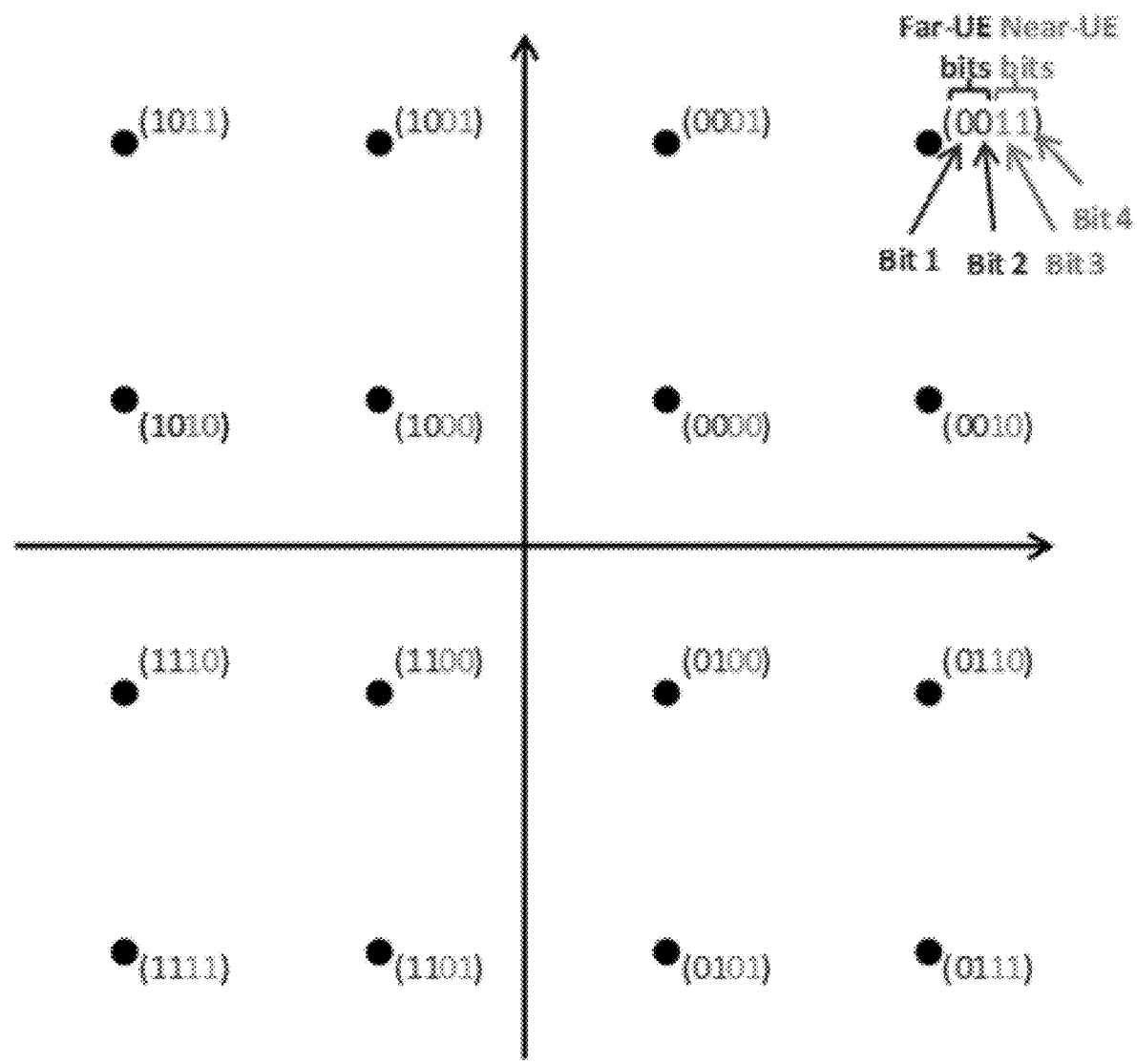
FIG. 7 depicts an example label bits assignment on a composite constellation.

One or more label bits may be assigned to the MUST-near WTRU or the MUST-far WTRU. FIG. 7 depicts an example label bits assignment on a composite constellation.

A WTRU may receive a communication from a network entity. The communication may include one or more types of transmissions and/or traffic. Two types may be used herein for non-limiting exemplary purposes, but any number of types may be used and still be consistent with examples herein. Traffic may include one or more transmissions. Transmission and traffic may be used interchangeably herein.

In embodiments and examples described herein, a first traffic type may be referred to as a nominal traffic. A second traffic type may be referred to as a low latency traffic. The first traffic type and the second traffic type may have different latency requirements. For example, the second traffic type may have a latency requirement that is shorter than the first traffic type. The first traffic type and the second traffic type are intended as non-limiting examples of traffic types. One or more other (e.g., any other) traffic types may be used and still be consistent with examples herein.

A second traffic type may include an Ultra-Reliable and Low-Latency Communications (URLLC) traffic. A second traffic type (e.g., low latency traffic) may be critical, reliable, ultra-reliable, or mission critical traffic. For example, the second traffic type may be a URLLC type of traffic. A first traffic type (e.g., nominal traffic) may include an enhanced Mobile BroadBand (eMBB) type of traffic. A first traffic type may be non-critical, less-latency constrained, or non-latency constrained type of traffic. For example, the first traffic type may be an eMBB type of traffic.

In embodiments and examples described herein, URLLC and/or eMBB may be used as an example traffic and/or transmission type. URLLC and eMBB are used as non-limiting examples and may be replaced by one or more other (e.g., any other) types of transmission and/or traffic and still be consistent with the examples herein.

Some traffic may be considered relatively important or otherwise have stringent QoS requirements. For example, low latency traffic may be such traffic. Traffic (e.g., such as the low latency traffic) may be unpredictable. The traffic may be aperiodic and/or infrequent. Reserving dedicated resources, for example to ensure availability when needed, may result in inefficient use of the spectrum and/or may be undesirable. Not reserving resources for such traffic may result in a lack of availability of resources for the traffic (e.g., when the low latency traffic may need to be transmitted). One or more resources already assigned to a first transmission may need to be shared with and/or reassigned to a second transmission.

Figure 8:
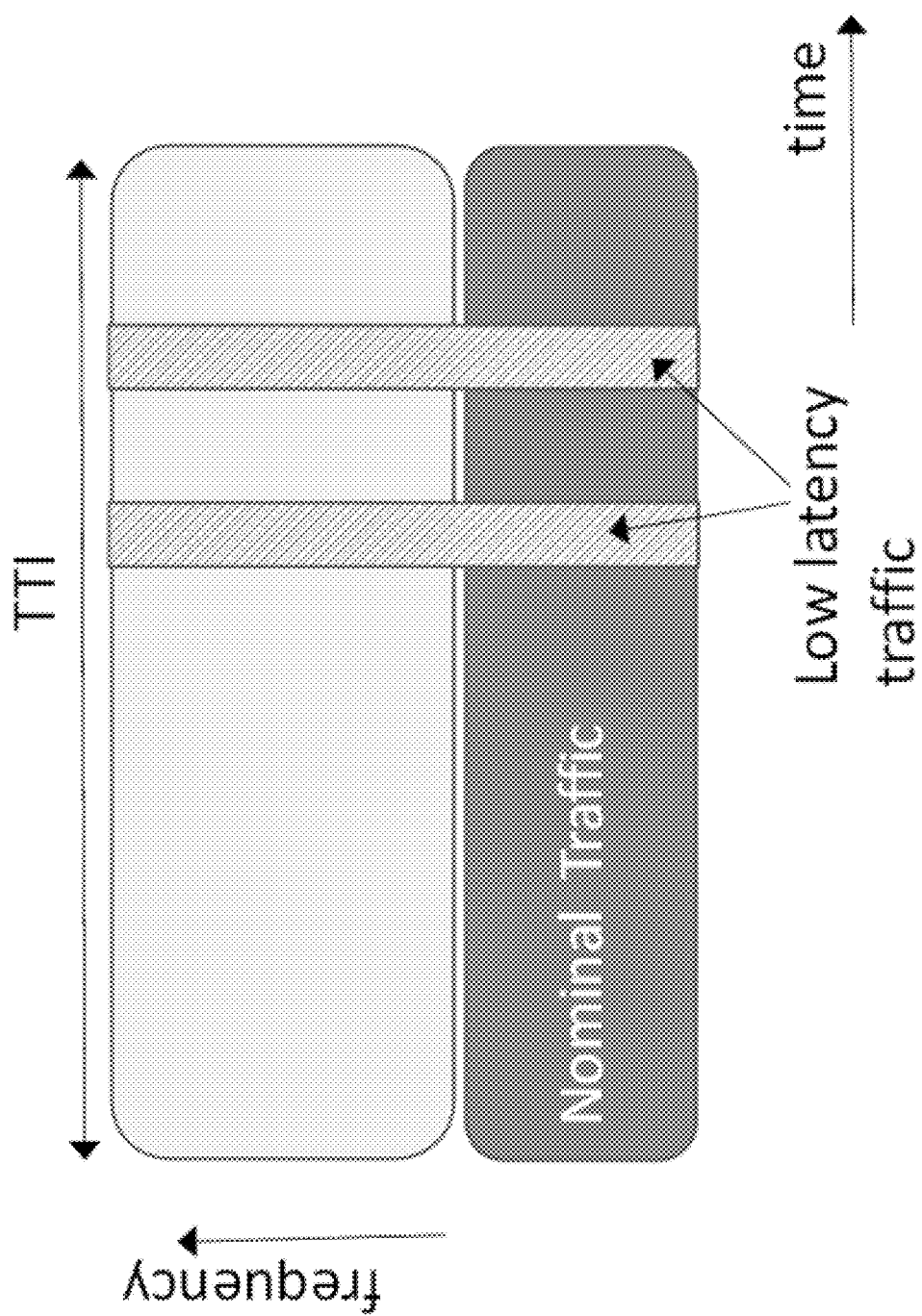
FIG. 8 depicts an example resource reassignment from one traffic type to another traffic type.

FIG. 8 depicts an example resource reassignment from one traffic type (e.g., nominal traffic) to another (e.g., low latency traffic).

When resources are shared between transmissions or one transmission uses one or more resources assigned to another transmission, performance may be impacted, for example due to interference and/or puncturing. Multiplexing of transmissions in the same resource(s) may be enabled in a manner that considers and/or reduces the performance impact to the transmissions.

The transmission of a request, a grant, a HARQ feedback, and/or data may be performed in and/or according to a timing of one or more blocks and/or chunks, for example one or more subframes. A duration of the one or more subframes may be a fixed and/or known duration (e.g., 1 ms). The duration may be referred to as a transmission time interval (TTI).

A resource element (RE) may correspond to a set of resources in time and/or frequency. A set of frequency resources may include a set of one or more subcarriers. A set of time resources may include a set of one or more time samples and/or symbols. An RE such as an LTE RE may include one subcarrier in frequency for a time period of one symbol.

A punctured RE and/or a group of punctured REs may be assigned (e.g., initially assigned) to one transmission type and may be used to carry traffic for more than one transmission type (e.g., initially assigned transmission type and punctured transmission type).

Non-latency constrained traffic and low latency traffic may be multiplexed at the RE level. For example, a transmitter may puncture one or more (e.g., all) bits of some RE(s) originally assigned to a first type of traffic (e.g., the nominal traffic). The transmitter may transmit a second type of traffic (e.g., low latency traffic) on the one or more (e.g., all) punctured RE(s), for example to enable transmission of low latency traffic. The transmitter may use full puncturing of one or more selected RE(s), for example if a WTRU with a nominal data to send and a WTRU with a low latency data to send experience similar channel conditions.

Figure 9:
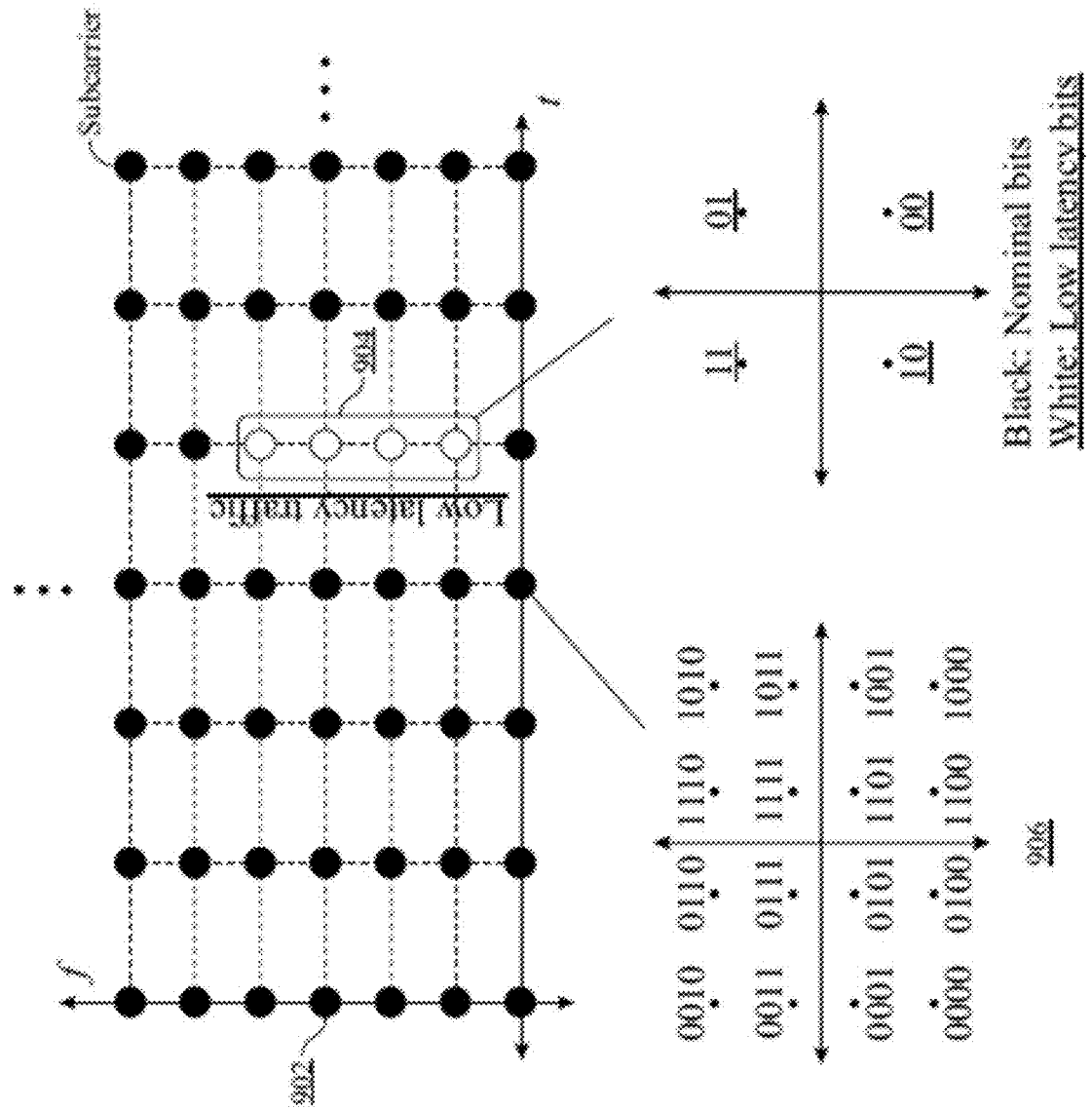
FIG. 9 depicts an example traffic multiplexing with full puncturing of the nominal traffic.

For example, a transmitter may use 16-quadrature amplitude modulation (QAM) for one or more non-punctured RE(s). The one or more non-punctured RE(s) may be used for a first type of traffic (e.g., nominal traffic). The transmitter may use a lower order modulation (e.g., such as quadrature phase-shift keying (QPSK) modulation) for one or more punctured RE(s). The one or more punctured RE(s) may be used for a second type of traffic (e.g., low latency traffic). FIG. 9 depicts an example traffic multiplexing with full puncturing of the nominal traffic 902 by the low latency traffic 904. For example, the nominal traffic 902 may have 16-QAM modulation 906 and the low latency traffic 904 may have QPSK modulation 908.

In embodiments and examples described herein, 16-QAM and/or QPSK modulation may be used as an example of different order modulation. 16-QAM and/or QPSK modulation are used as non-limiting examples and may be replaced by one or more other (e.g., any other) order of modulation and still be consistent with examples herein.

A transmitter may multiplex coded bits of different services at the RE level, for example to transmit both nominal and low latency traffic in the same RE or group of REs.

Figure 10:
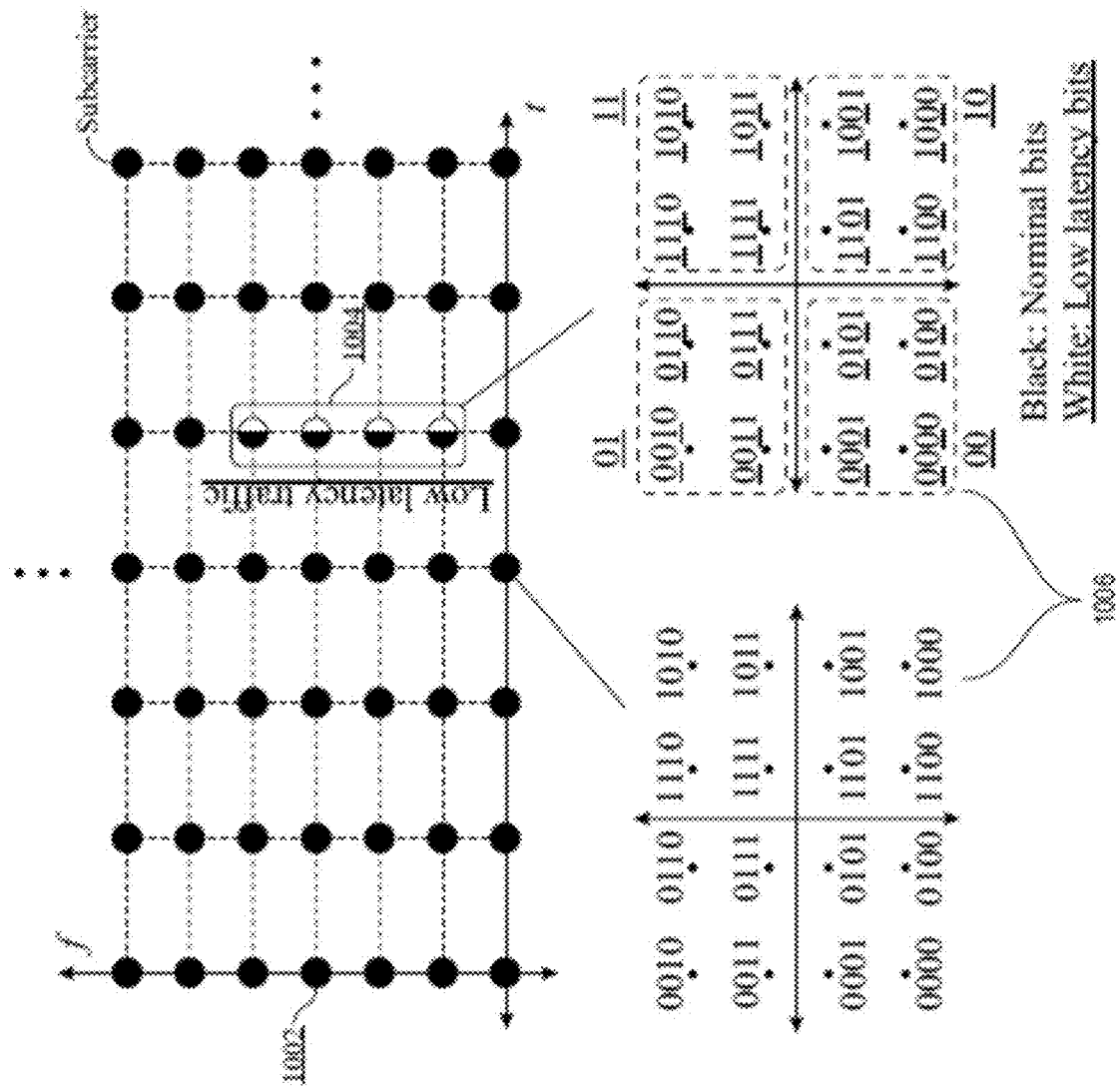
FIG. 10 depicts an example resource element (RE) level traffic multiplexing using hierarchical modulation.

For example, a transmitted constellation may remain constant across one or more (e.g., all) sub-carriers and/or symbols. One or more bits of the modulation symbol for the punctured REs may be used for the nominal traffic. One or more remaining bits of the modulation symbol may be used for the low latency traffic. FIG. 10 depicts an example RE level traffic multiplexing using hierarchical modulation. For example, the constellation may be 16-QAM modulation 1006 for first traffic (e.g., the nominal traffic) 1002 and the bits on one or more (e.g., 4) REs may be punctured for second traffic (e.g., the low latency traffic) 1004. One or more (e.g., 2) bits out of the 4 bits of a punctured RE may be used for the nominal traffic 1002. One or more (e.g., 2) other bits of a punctured RE may be used for the low latency traffic. In another example, the constellation may use 64-QAM modulation, and one or more punctured REs may use one or more (e.g., 4) bits for the nominal traffic and one or more (e.g., 2) bits for the low latency traffic. In another example, the constellation may use 256-QAM modulation, and one or more punctured REs may use one or more (e.g., 4) bits for the nominal traffic and one or more (e.g., 4) bits for the low latency traffic. One or more other means of partitioning the bits of the nominal traffic and/or the low latency traffic may be performed in the punctured resources.

A receiver of the nominal traffic may detect one or more punctured RE(s). The receiver may pad zeros in the bit locations assigned for the other traffic (e.g., the low latency traffic) in the one or more punctured REs, for example, to decode the demodulated symbols.

A number of bits that may be assigned for the second type of traffic (e.g., the low latency traffic) may be predefined, configured (e.g., via higher layer signaling), and/or indicated (e.g., in a downlink configuration information (DCI)). A bit mapping (e.g., Gray mapping, or non-Gray mapping) may be predefined, configured (e.g., via higher layer signaling), and/or indicated (e.g., in a DCI). A location of one or more potential punctured RE(s) in time and/or frequency may be predefined, configured via (e.g., higher layer signaling), and/or indicated (e.g., in a DCI).

Punctured data may be associated with a different modulation order than non-punctured data. For example, a transmitter may use a first modulation order for one or more punctured RE(s). The transmitter may use a second modulation order for one or more non-punctured RE(s). In examples, the first modulation order may have higher modulation order than the second modulation order. The punctured data may be associated with a different modulation order, for example to multiplex two different types of traffic (e.g., the nominal and the low latency traffic) and/or increase the reliability of demodulating the one or more punctured RE(s). The transmitter may reduce the modulation order for the one or more punctured RE(s) (e.g., as compared to that of nominal traffic). The transmitter may reduce the modulation order for the one or more punctured REs to increase reliability. The nominal traffic may have higher modulation order than the low latency traffic. For example, the modulation order may be reduced from 16-QAM modulation (e.g., for nominal traffic) to QPSK modulation (e.g., for low latency traffic).

Figure 11:
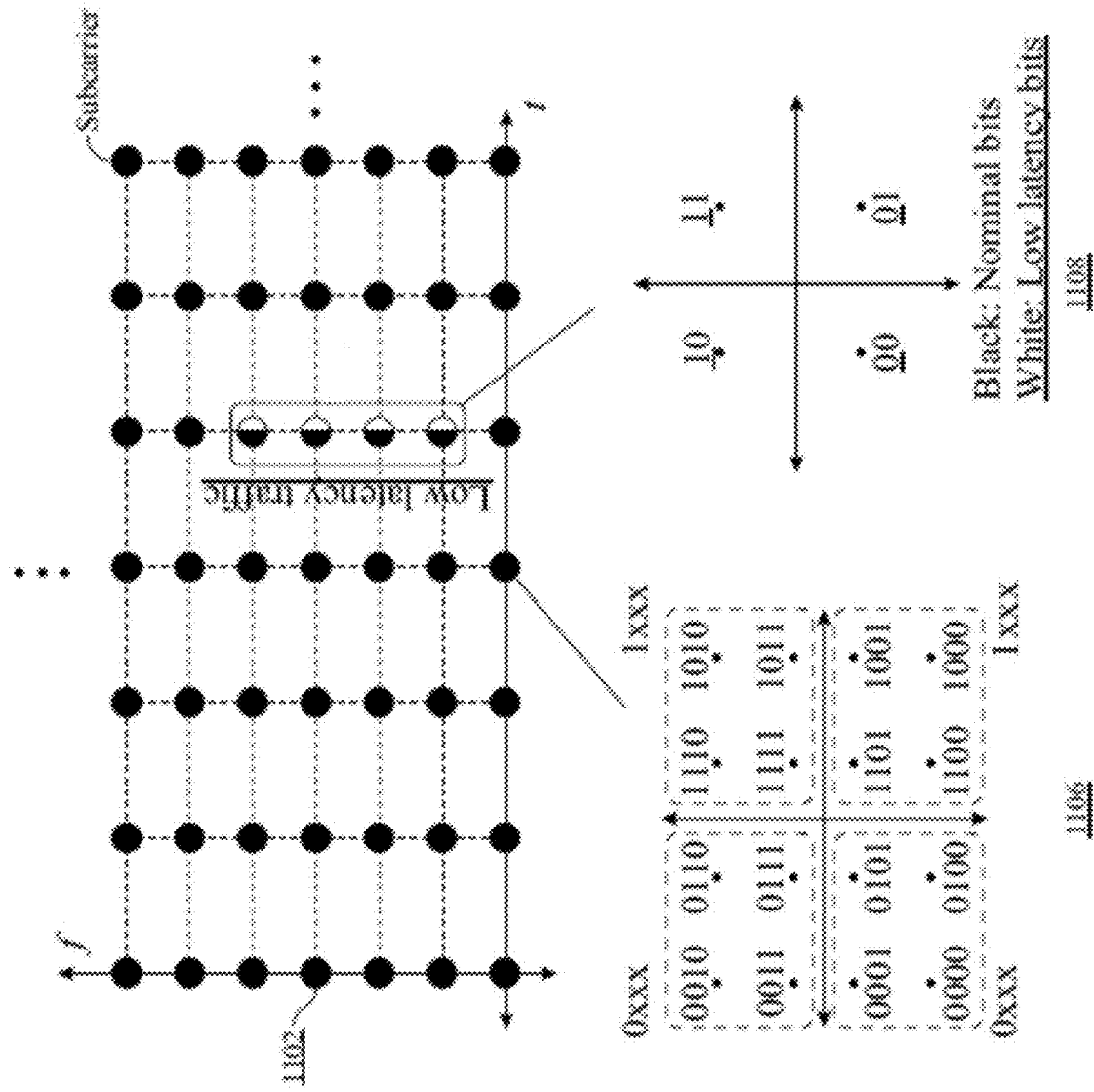
FIG. 11 depicts an example use of a different modulation type for punctured data.

FIG. 11 depicts an example use of a different modulation type for punctured data. For example, as illustrated in FIG. 11, the modulation of one or more non-punctured RE(s) (e.g., used for the nominal traffic) 1102 may be 16-QAM modulation 1106 and may use Gray mapping. The left and/or right semi-plane of the constellation may determine the most significant bit (MSB) of the nominal data symbol. The transmitter may use QPSK modulation 1108 for the one or more punctured RE(s) (e.g., used for the low latency traffic). The transmitter may map (e.g., jointly map) the nominal and low latency data symbols (e.g., according to the mapping of FIG. 11). The mapping of the nominal and low latency data symbols may enable the receiver of the nominal traffic to detect (e.g., reliably detect) the MSB of the original nominal symbol. The receiver of the low latency traffic may detect (e.g., reliably detect) the transmitted low latency symbol.

One or more other examples of using different modulation order for the punctured RE(s) may be performed.

Figure 12A:
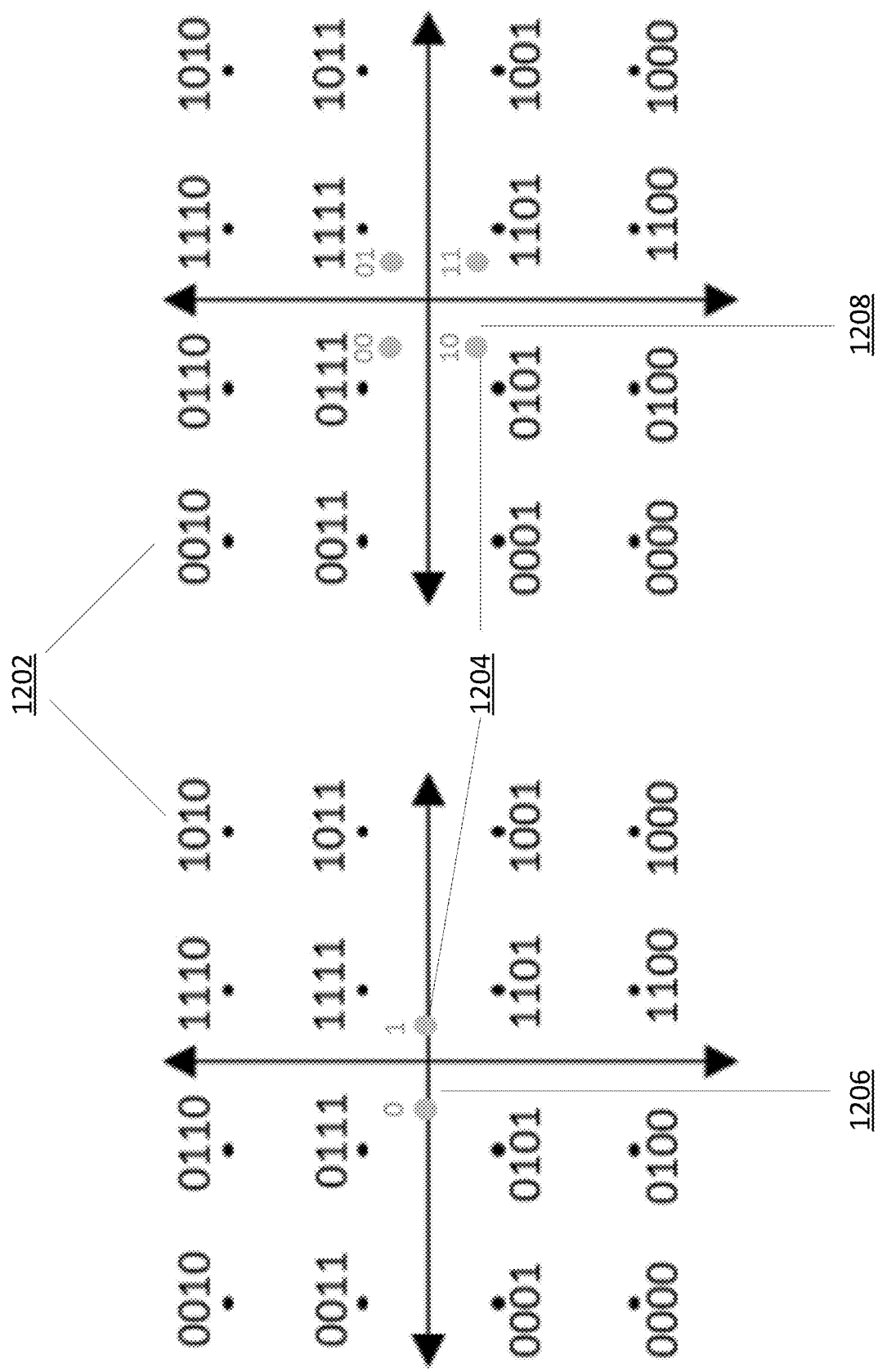
FIGS. 12A and 12B depict example overlapping of nominal traffic and low latency traffic.
Figure 12B:
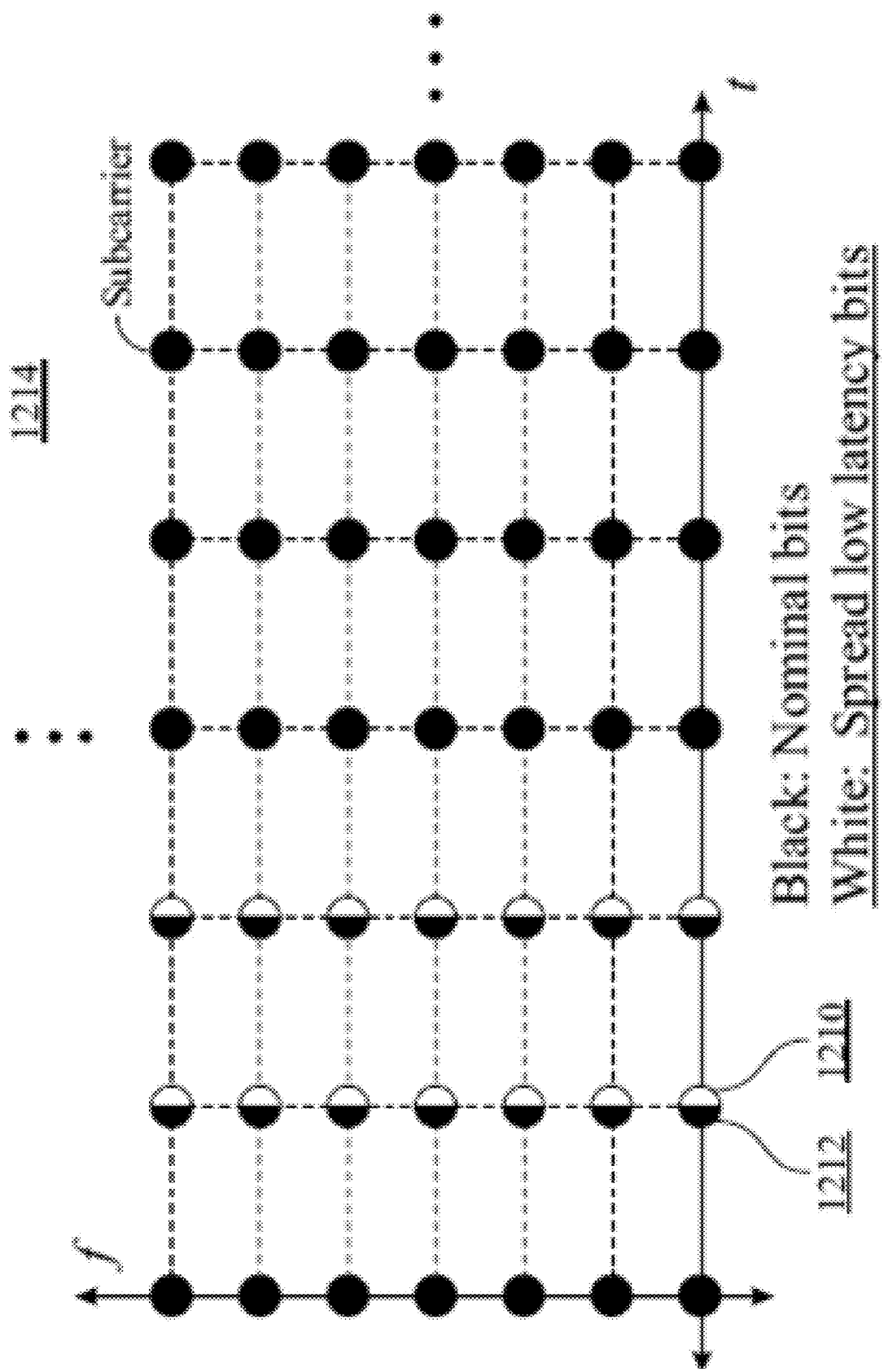

Traffic may be overlapped using different constellations. For example, one or more low latency bits may be transmitted along with one or more nominal bits at lower power level. The one or more low latency bits may be spread over multiple points in time and/or frequency (e.g., using multiple orthogonal spreading codes). FIGS. 12A and 12B depict an example of overlapping nominal and low latency traffic. For example, as shown in FIG. 12A, one or more low latency bits 1204 may be modulated in BPSK 1206 and QPSK 1208, respectively, which are transmitted at the same time (e.g., at a lower power) with nominal traffic 1202. One or more bits of the nominal traffic 1202 may be modulated using 16-QAM. As shown in FIG. 12B, one or more (e.g., two) traffic types (e.g., 1210 and 1212) may be transmitted in an overlapping manner. For example, one or more low latency bits (e.g., gray colored bits) 1210 may be spread over two or more (e.g., 8) subcarriers 1214 and/or two or more (e.g., 2) time symbols. The power level of the one or more low latency bits may be set and/or controlled based on a reliability requirement. For example, the power level of the one or more low latency bits may be a higher power level if the reliability requirement is high. The size of the spreading codes (e.g., spreading factor) may be controlled based on the reliability requirement. For example, a longer spreading code may be used if the reliability requirement is high. A de-spreading may be performed at the receiver. The de-spreading may recover the one or more low latency bits 1210.

Antenna resource adaption may be performed. A low latency may utilize a high transmission gain (e.g., to assure a high chance of successful first-time transmission, avoid repeated re-transmissions, and/or avoid excessive delay). The high transmission gain may be achieved through use of a high number of antenna ports. The high number of antenna ports may allow a better precoding and/or beamforming given the channel condition and/or WTRU location. For example, the number of antenna ports used for a given number of transmission codewords per traffic type may be adjusted. The number of antenna ports may be adjusted to accommodate transmission (e.g., simultaneous) of the nominal traffic and the low latency traffic.

Figure 13:
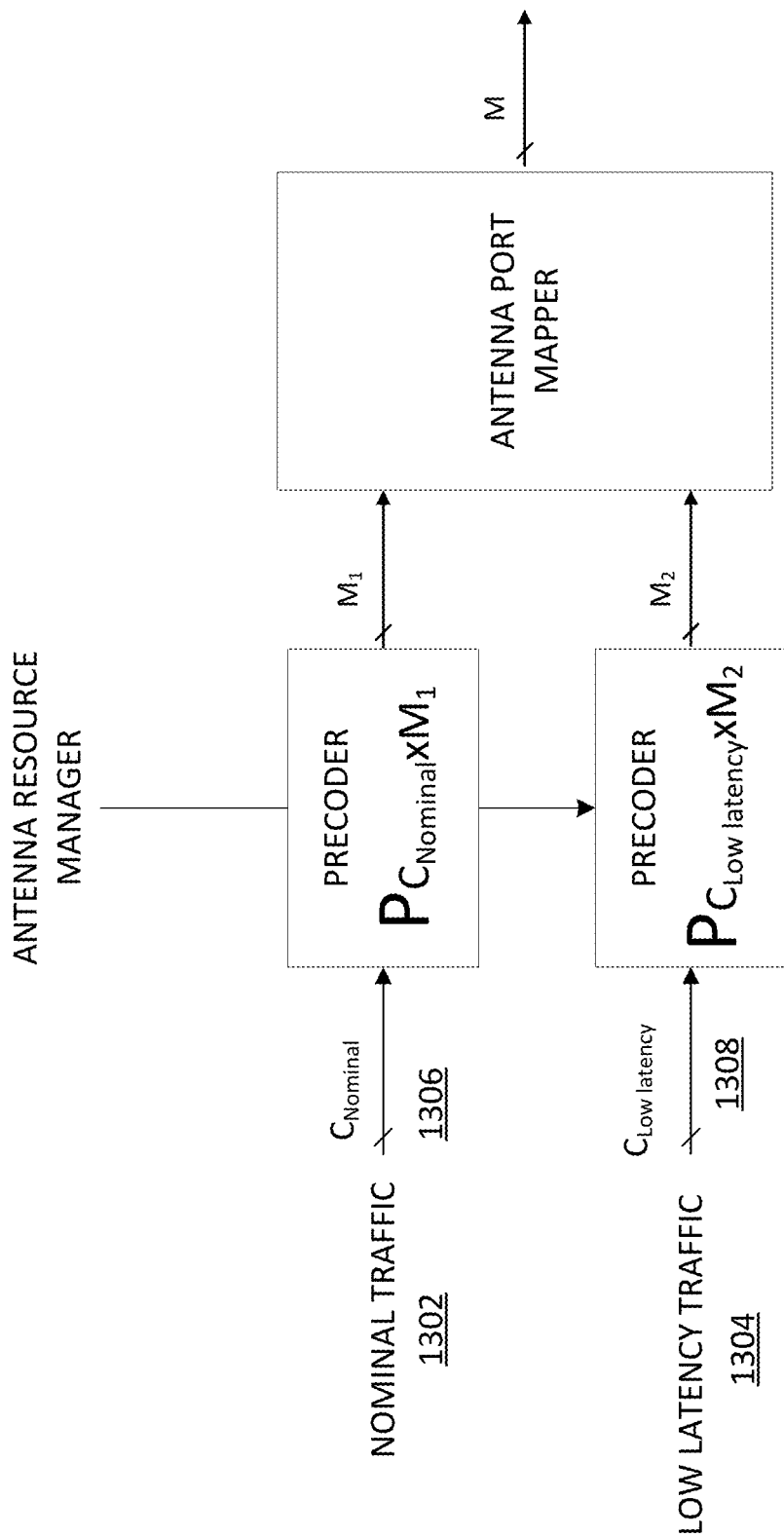
FIG. 13 depicts an example antenna resource allocation based on traffic type.

For example, in the absence of low latency traffic, M antenna ports and/or layers may be used for the transmission of $C_{Nominal}$ codewords of the nominal traffic by using a precoding matrix P with a dimension of $M \times C_{Nominal}$, where $M > C_{Nominal}$. The precoding matrix may be the actual precoder of a beamforming subsystem. The precoding matrix may be the inner precoder of a hybrid-precoding structure. By arrival of the low latency traffic, the transmitter (e.g., eNB) antenna resource manager may shift one or more antenna resources (e.g., $M_1$ out of the M available antenna ports that had been initially used for the nominal traffic) for transmission of $C_{low\ latency}$ codewords of the low latency traffic. The transmitter may utilize (e.g., only utilize) $M_2=M-M_1$ antenna ports out of the overall resources for transmission of the codewords of the nominal traffic. FIG. 13 depicts an example antenna resource allocation based on traffic type (e.g., nominal traffic 1302 and/or low latency traffic 1304). Allocation of more antenna ports to the low latency traffic 1304 may enable a robust transmission (e.g., more robust transmission) for the low latency traffic 1304.

For example, where the total number of antenna ports $M >> C_{Nominal}$ 1306 and $M >> C_{low\ latency}$ 1308, the number of ports allocated for the low latency traffic 1304 may be selected (e.g., independently) without impacting the beamforming performance of the nominal traffic 1302.

One or more puncturing patterns may be used. For example, when multiplexing information for multiple traffic types, the transmitter may determine to puncture one or more RE(s) located adjacent in time and/or frequency to one or more (e.g., any) reference and/or fixed symbols, for example for enhanced reliability (e.g., to minimize the performance degradation due to the channel estimation errors).

Figure 14:
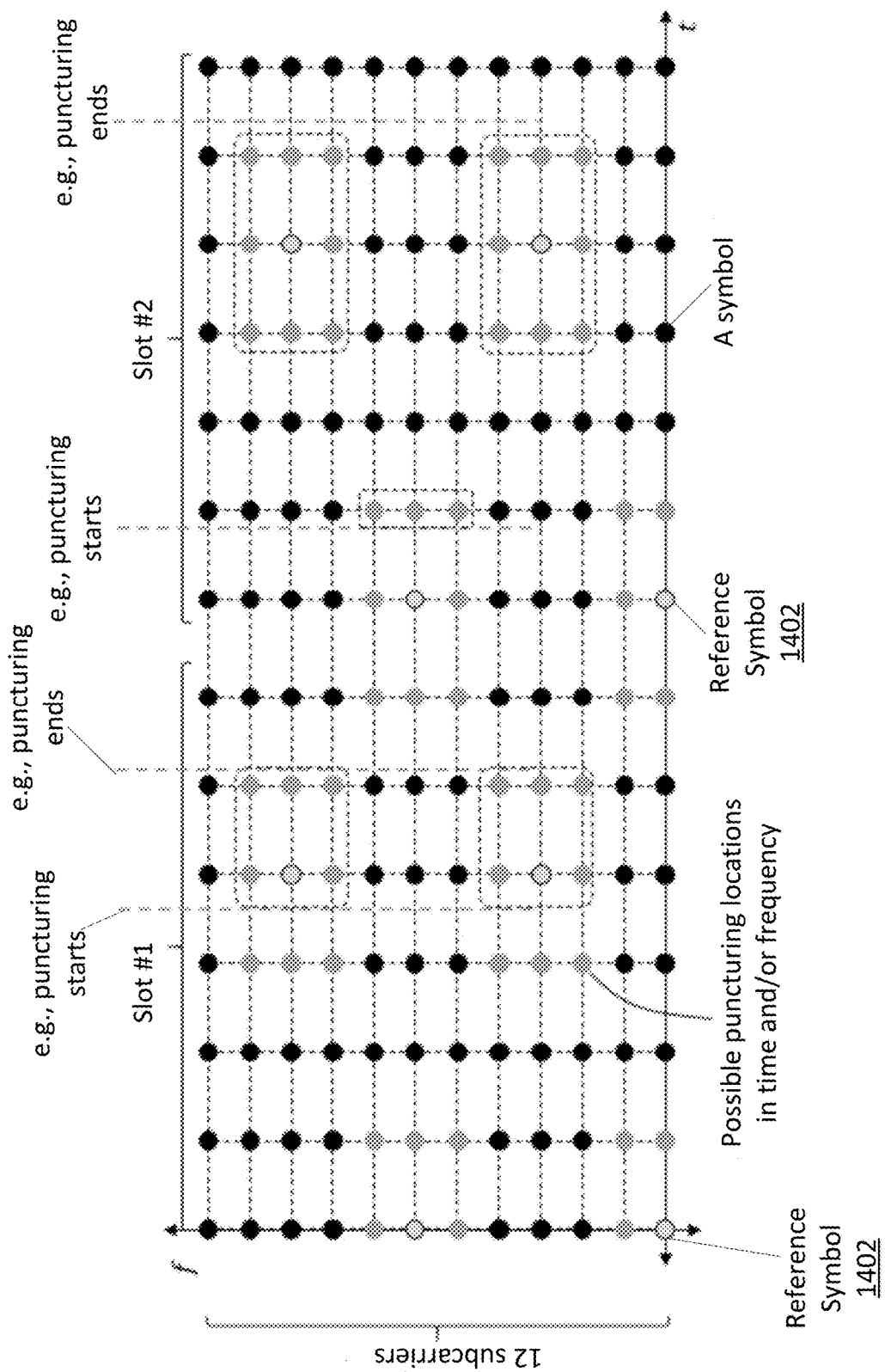
FIG. 14 depicts an example puncturing pattern for enhanced downlink (DL) reliability.

FIG. 14 depicts an example puncturing pattern, e.g., for enhanced downlink (DL) reliability. For example, in LTE, for DL transmission of a TTI illustrated in FIG. 14, the one or more symbols (e.g., REs) adjacent in time and/or frequency to the reference symbols 1402 may be selected as the possible locations for the puncturing operation. The transmitter may start puncturing the one or more RE(s) starting from the earliest symbols in time determined by the puncturing pattern, which may be predefined and/or preconfigured. For example, the transmitter may start puncturing when low latency traffic occurs and/or needs to be transmitted. The puncturing may continue for a predetermined duration, which may be predefined and/or preconfigured. The puncturing may continue until an indicated symbol in time, or to the end of a TTI (e.g., as shown in FIG. 14).

Figure 15:
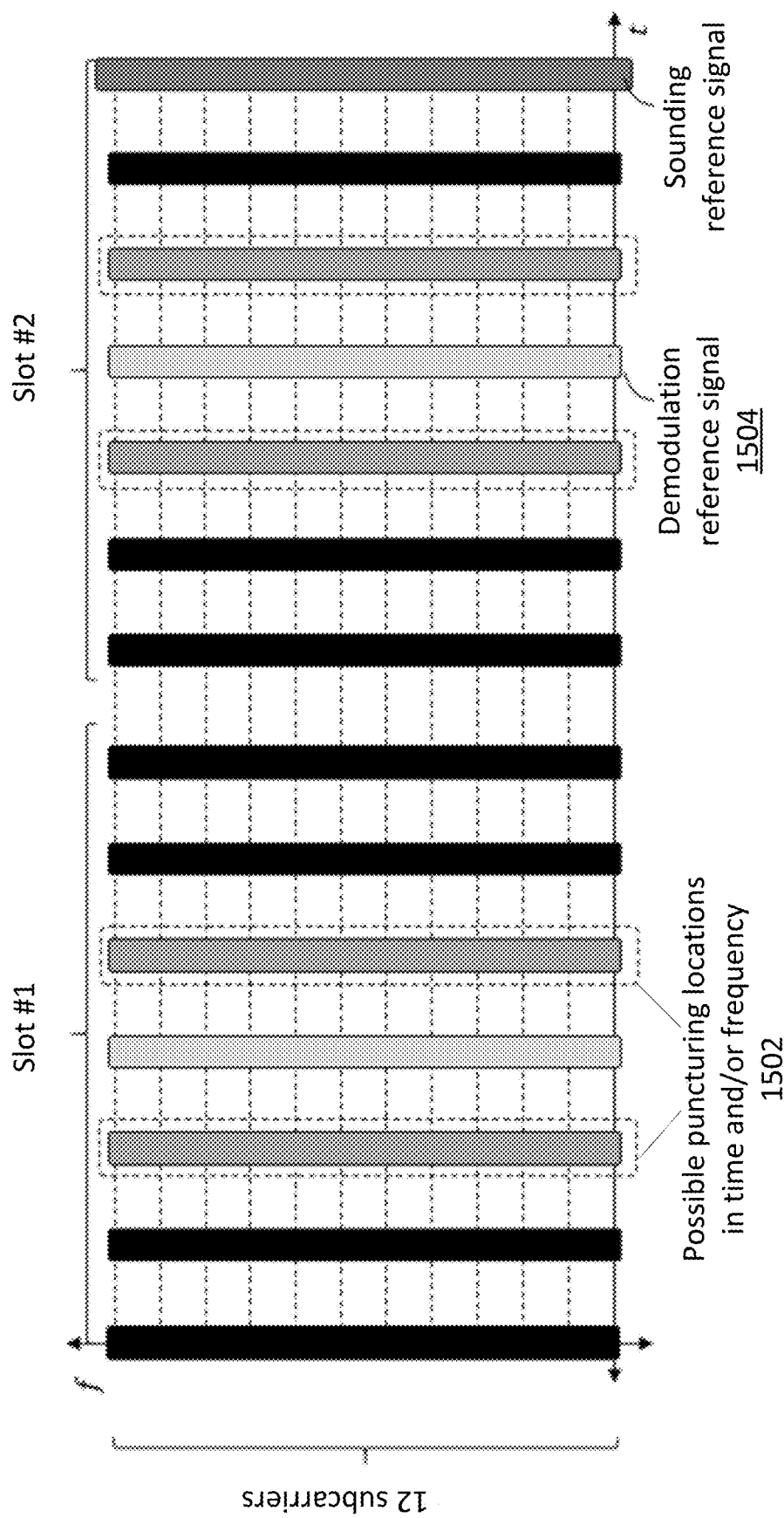
FIG. 15 depicts an example puncturing pattern for enhanced uplink (UL) reliability.

FIG. 15 depicts an example puncturing pattern for enhanced uplink (UL) reliability. For example, for the uplink of an LTE TTI, one or more symbols (e.g., REs) 1502 before and/or after a demodulation reference signal 1504 may be punctured. The one or more symbols may be punctured for the transmission of multiplexed traffic.

Figure 16:
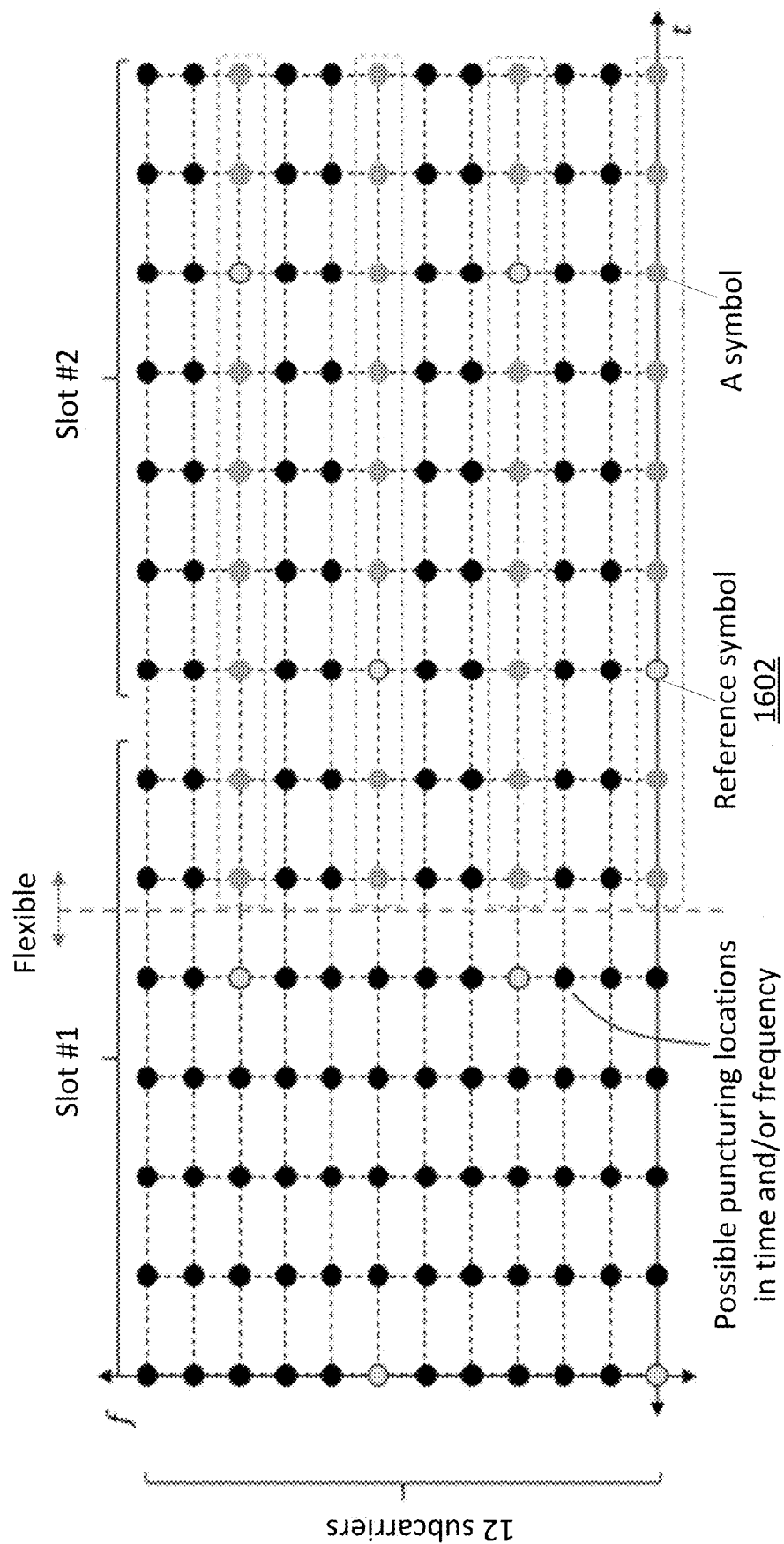
FIG. 16 depicts an example puncturing pattern for reduced latency.

FIG. 16 depicts an example puncturing pattern, e.g., for reduced latency. For example, the transmitter may select a puncturing pattern that may include the one or more subcarriers that have reference symbols (e.g., when multiplexing information for multiple traffic types) 1602. A symbol may be mapped to a subcarrier. A subcarrier may be a resource that carries one or more symbol(s). A subcarrier may be left empty or loaded with symbol(s). The transmitter may start the puncturing when the low latency data arrives (e.g., for achieving reduced latency for the low latency transmission), e.g., to the right of vertical dashed line in FIG. 16. The puncturing may continue for a predetermined duration. In examples, the puncturing may continue up to an indicated symbol in time. In examples, the puncturing may continue to the end of the TTI.

Figure 17:
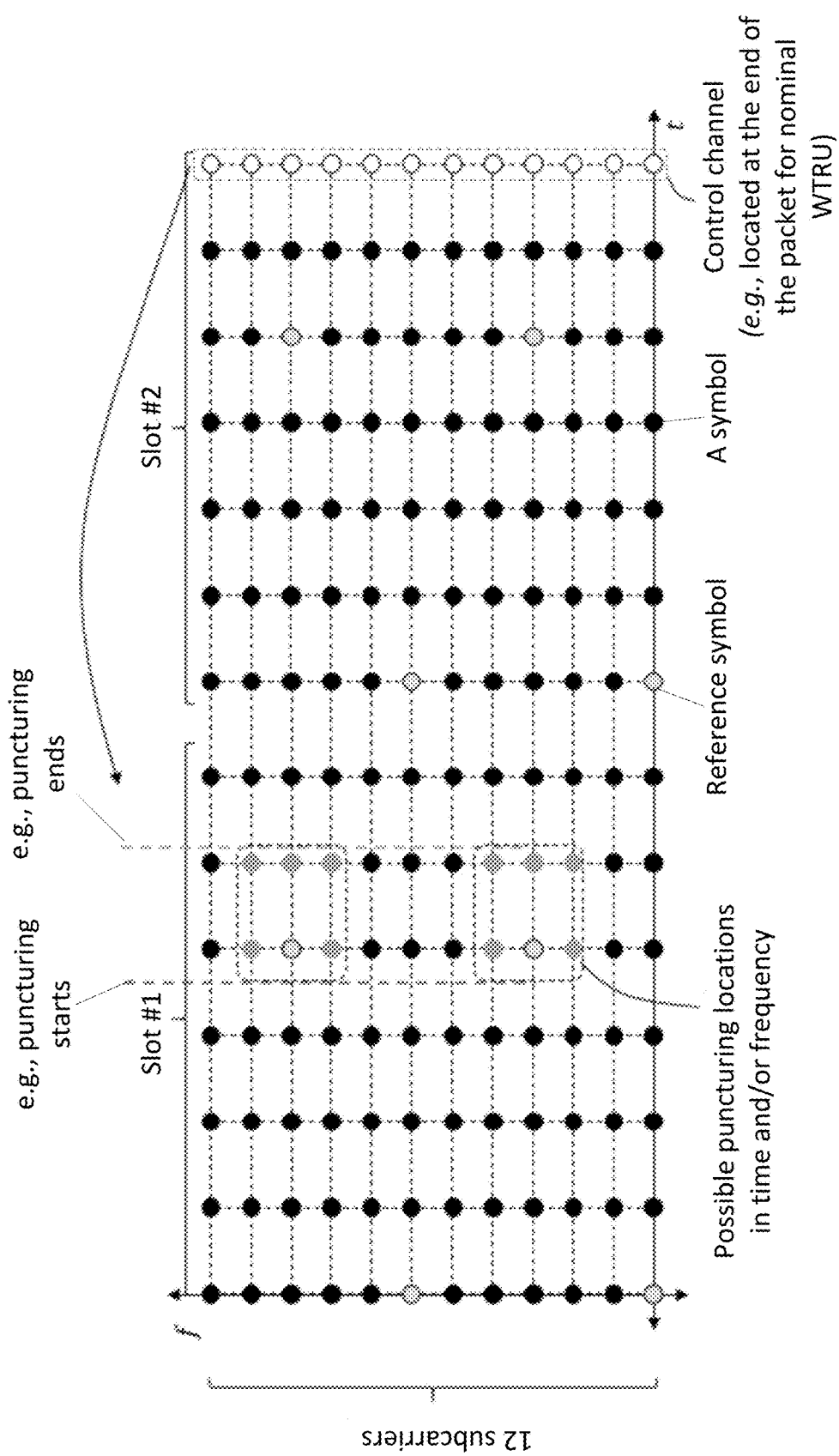
FIG. 17 depicts an example control signal for indicating one or more punctured locations in the DL.

Punctured data may be indicated and/or detected using a control channel. For example, the transmitter may signal the location of one or more punctured RE(s) using a control channel. The control channel may be located at the end of the TTI (e.g., to signal the presence of multiplexed traffic to the receiver of the nominal traffic and/or the receiver of the low latency traffic). FIG. 17 depicts an example control signal for indicating one or more puncturing patterns and/or locations in the communication. For example, as shown in FIG. 17 for the DL, a length of control information may be one symbol duration or multiple symbols durations. The control information may spread across a sub-band and/or an entire band.

In the downlink and/or uplink, control information may include one or more of: time indices of the puncturing start, time indices of the puncturing stop, a number of the punctured symbols in time and frequency (e.g., directly or indirectly), or a puncturing pattern.

Figure 18:
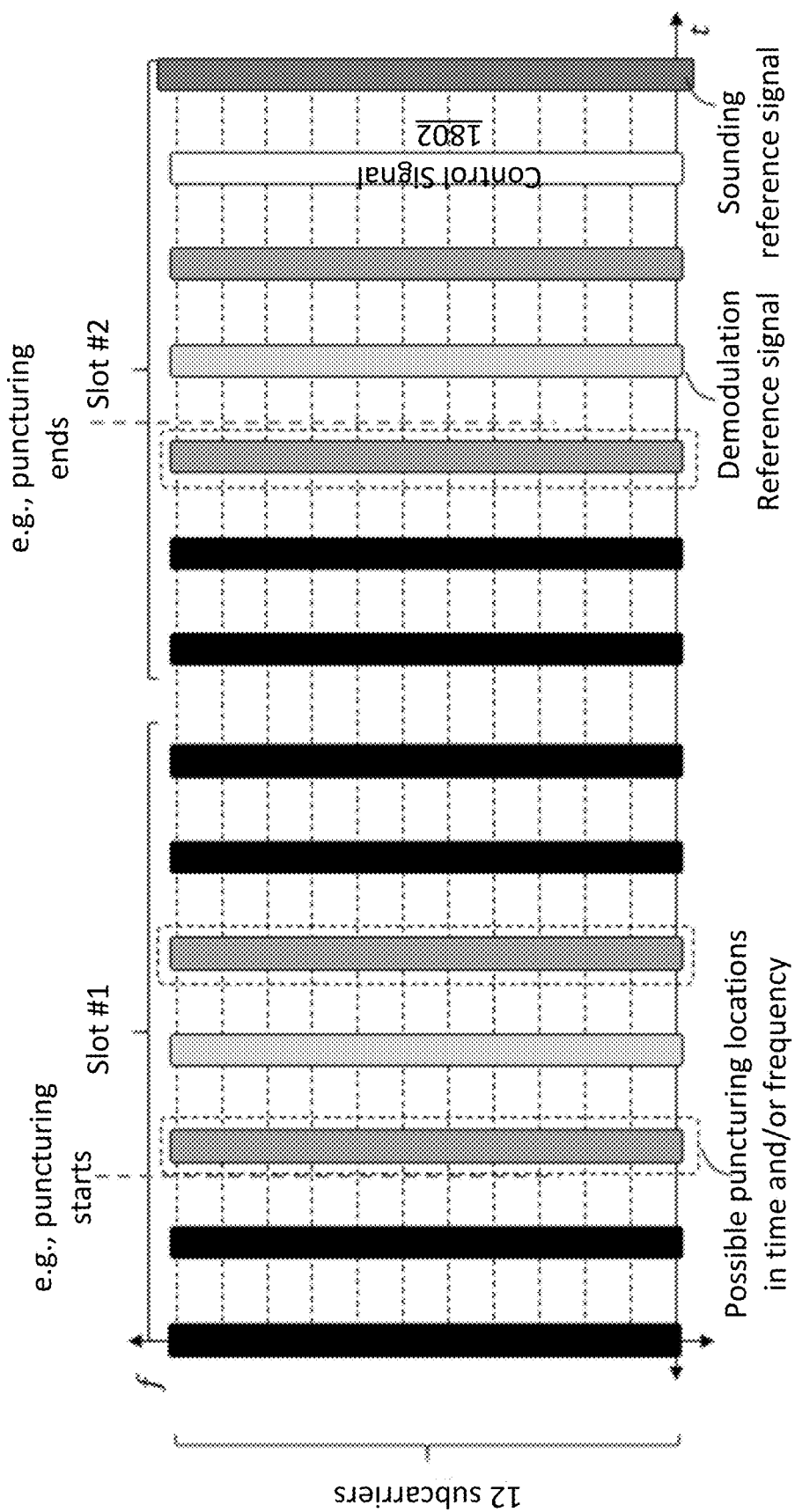
FIG. 18 depicts an example control signal for indicating one or more punctured locations in the UL.

FIG. 18 depicts an example control signal 1802 for indicating one or more punctured locations in the UL. For example, as shown in FIG. 18 for the uplink, the control information may be encoded with a sounding reference signal (SRS). One or more symbols before the SRS may be used for the control channel.

One or more orthogonal frequency-division multiplexing (OFDM) symbol (e.g., each OFDM symbol) and/or another waveform symbol may include control information. The control information may indicate for example a current, previous, and/or next punctured symbol. The control information may indicate one or more indices of the punctured symbols. The control information may indicate a number of the punctured symbols. The control information may indicate a puncturing pattern.

Figure 19:
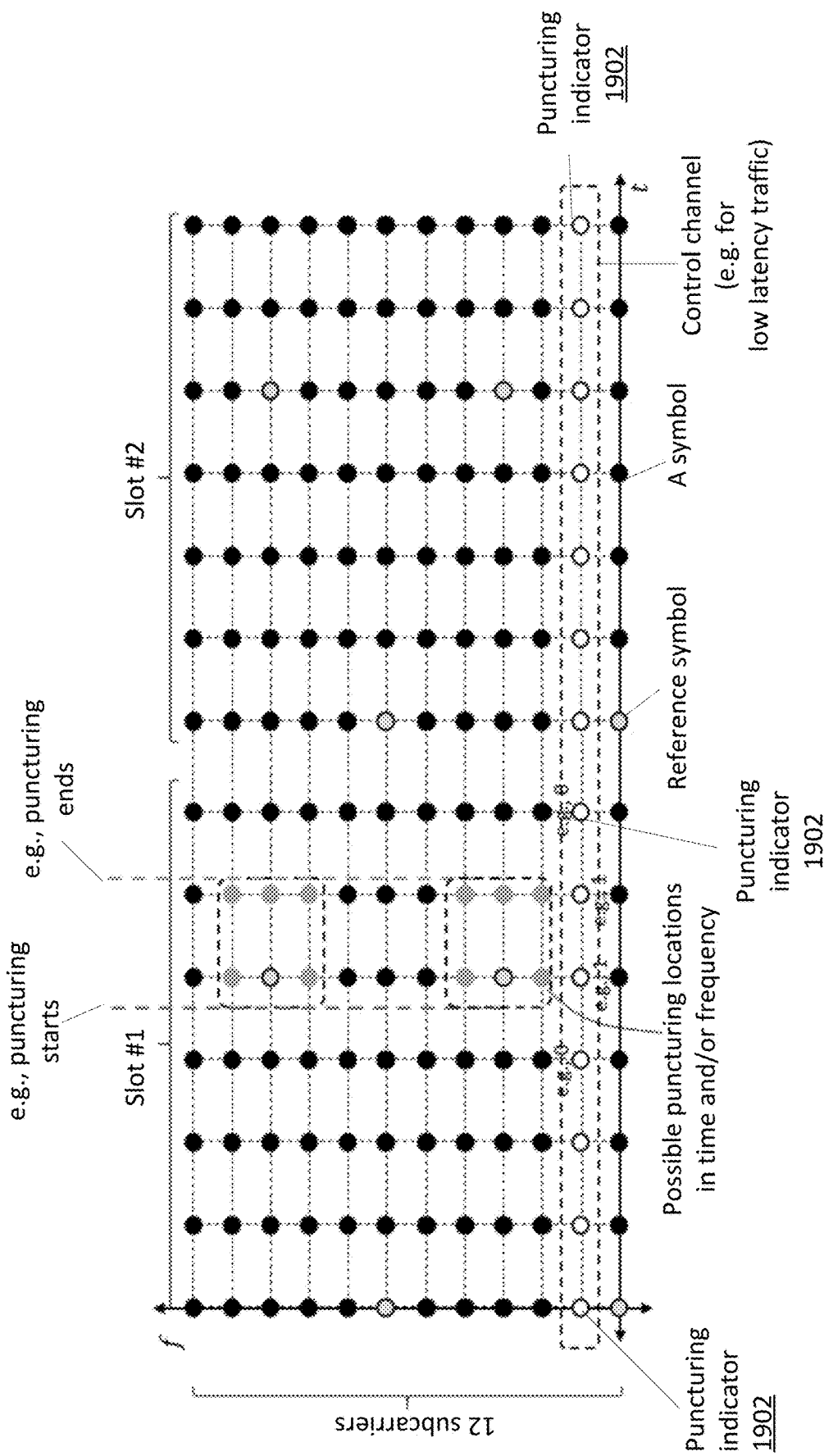
FIG. 19 depicts an example indication of the punctured locations within a symbol.

A puncturing indicator may be used for indication (e.g., fast indication) of punctured data. One or more subcarriers in OFDM symbols and/or one or more REs may indicate if there is a set of punctured subcarriers (e.g., REs) in the current and/or adjacent OFDM symbols (e.g., via the puncturing indicator). A puncturing indicator may be used, for example, for latency reduction. FIG. 19 depicts an example indication of the punctured locations within a symbol. For example, a location of the puncturing indicator 1902 may be fixed and/or predefined as shown in FIG. 19. The location of the puncturing pattern may be predefined and/or semi-statically signaled via signaling (e.g., higher layer signaling). The existence of one or more punctured RE(s) may be indicated in the OFDM symbol of the puncturing indicator. For example, one of the REs in the same OFDM symbol may indicate the one or more punctured REs. For example, one of the REs in the same OFDM symbol may be set to 1 or −1 (or may be set to 1 or 0), e.g., a binary indicator, to indicate the one or more punctured REs. One of the REs in the same OFDM symbol may be set to 1 to indicate the existence of one or more punctured REs. One of the REs in the same OFDM symbol may be set to −1 (or 0) to indicate the non-existence of one or more punctured REs. The modulation type may be changed to indicate the one or more punctured REs.

Figure 20:
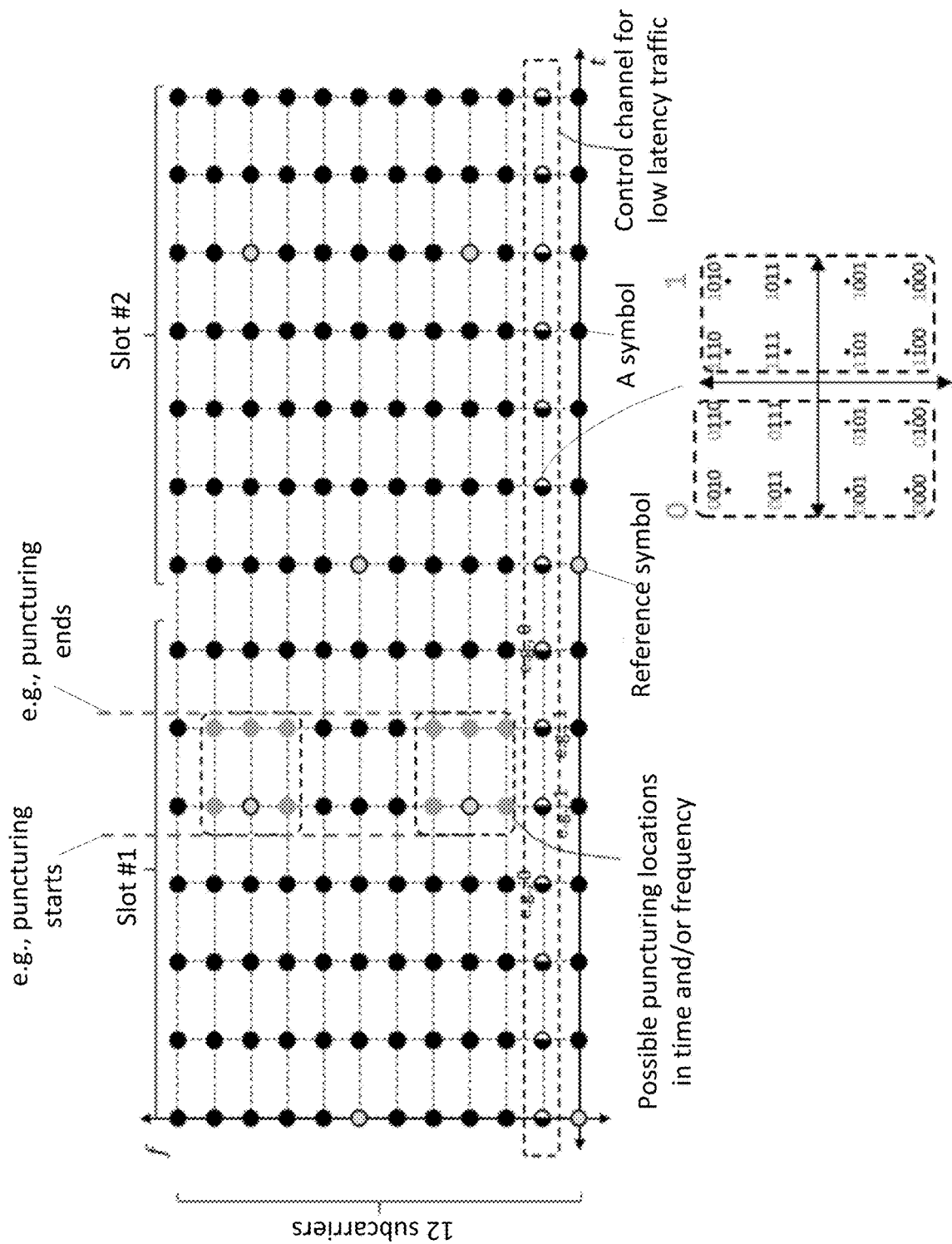
FIG. 20 depicts an example of multiplexing a puncturing indicator and nominal data in a resource.

FIG. 20 depicts an example of multiplexing a puncturing indicator and nominal data in a puncturing indicator resources. For example, a set of REs may carry both data and control information (e.g., simultaneously). One or more control bits and one or more data bits may be multiplexed in a constellation point (e.g., the same constellation point). One or more WTRU(s) with nominal and/or low latency data to send may monitor the set of REs. A WTRU may monitor set of REs to determine whether the RE(s) in an adjacent puncturing pattern are punctured. For example, as shown in FIG. 20, the puncturing indicator RE(s) may use 16-QAM. A most significant bit of the puncturing indicator REs may indicate the puncturing. For example, the most significant bit of the puncturing indicator REs may be 1 to indicate the puncturing. The most significant bit of the puncturing indicator REs may be 0 to indicate the non-puncturing. The last three bits of the puncturing indicator REs may be used for data transfer for a nominal WTRU.

One or more resources may be borrowed, e.g., dynamically. Dynamically borrowing one or more resources may impact a performance measure of (e.g., such as reduce an impact to) a non-latency constrained transmission. Some of the resources that have been allocated for a downlink transmission of a first type of traffic may be used to transmit a second type of traffic. An example of the first type of traffic may be mobile broadband traffic. An example of the second type of traffic may be low latency data. In this case, the performance of the transmission of the first type of traffic may degrade. Performance may be measured by using various parameters, such as block error rate.

For example, performance degradation may be reduced and/or prevented by allocating one or more resources (e.g., additional resources) to the downlink transmission of the first type of traffic. The one or more resources (e.g., additional resources) may include symbols that, if the second type of traffic had not used resources from the first type of traffic, would have been allocated for the uplink transmission of the first type of traffic.

Figure 21:
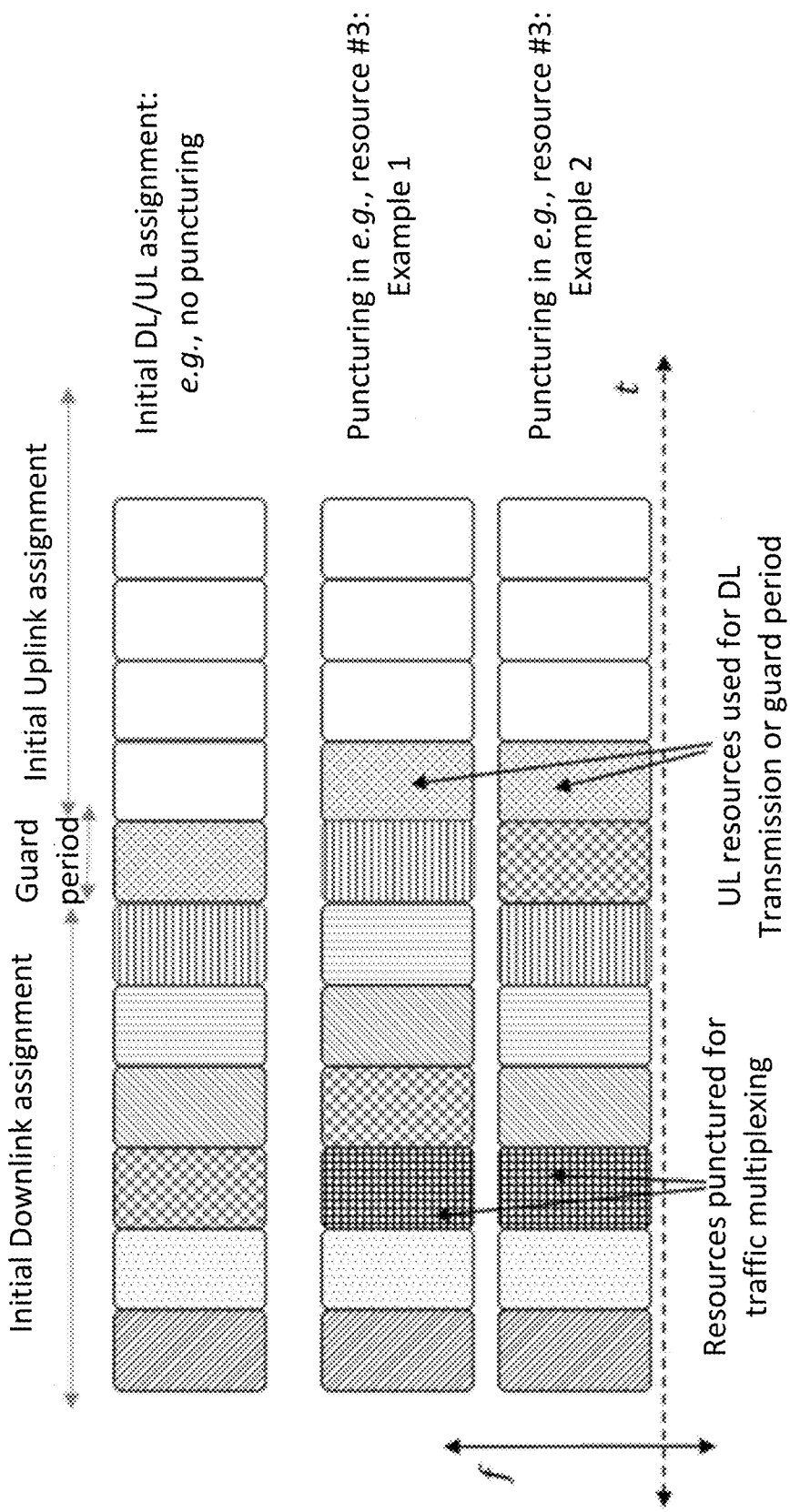
FIG. 21 depicts an example dynamic resource borrowing within a time division duplex (TDD) transmission time interval (TTI).

DL data may include data parts such as 1, 2, . . . N, where each part may have been scheduled to be transmitted on one OFDM symbol. For example, OFDM symbol 1 may carry data part 1 and OFDM symbol 2 may carry data part 2, etc. FIG. 21 depicts an example dynamic resource borrowing within a TDD TTI. As shown in FIG. 21, a DL portion of the TTI may include one or more (e.g., 6) OFDM symbols. Each of the one or more OFDM symbols may carry one part of the data from for example the first type of traffic. An OFDM symbol of the one or more OFDM symbols (e.g., OFDM index k=3) may be punctured. The punctured OFDM symbol may not be available for the transmission of the first type of traffic.

For example, a first DL symbol following a punctured symbol (e.g., symbol index k+1) may carry data part k. As shown in FIG. 21, symbol 3 may be punctured. The next DL symbol following the punctured symbol (e.g., symbol 4) may carry data part 3. The number of DL symbols originally allocated for DL transmission may be less than the number of data parts. One or more symbols may be borrowed from what was originally reserved for uplink transmission. The one or more borrowed symbols may be used for downlink transmission. As shown in FIG. 21, for example, example 1 may include a time allocated for the UL symbol with index 1. The time allocated for the UL symbol with index 1 may be used to transmit a downlink symbol that will carry data part 5.

As shown in FIG. 21, in example 2, one or more DL symbols may carry the data parts that were originally assigned to DL symbols. The data part that was supposed to be carried by the DL symbol that has been punctured may be carried by the DL symbol that is transmitted in the UL region of the TTI.

When one or more of the UL symbols is allocated to DL transmission, the uplink transmission may suffer due to fewer resources (e.g., resulting in a higher coding rate). A loss in block error rate may be a fraction of a dB or more. The loss in block error rate may be based on, for example, the amount of UL resources borrowed by the DL transmission. A WTRU may be configured to transmit the UL symbols with, for example, a higher power (e.g., to compensate for the loss in coding rate).

A control channel (e.g., an existing control channel or a new control channel) may be defined, modified, etc. The control channel may inform (e.g., via an indicator) the one or more WTRUs that some of the UL resources have been used for DL. The control channel may indicate a new power setting to the one or more WTRUs. The control channel may be placed in a pre-defined location (e.g., as discussed herein). For example, the control channel may be located at the last OFDM symbol of the original DL transmission. When the control channel is located, for example, at the last OFDM symbol of the original DL transmission, one or more WTRUs may read the control channel (e.g., at the last DL OFDM symbol). If the control channel includes information pertaining to puncturing of the DL transmission, the one or more WTRUs may not transmit in one or more of the UL OFDM symbols. During the one or more UL OFDM symbols, the one or more WTRUs may continue receiving DL traffic.

When the control channel is located at the last OFDM symbol of the original DL transmission, the information signaled in the control channel may include one or more of the number of UL symbols allocated for DL transmission, the power increase for UL transmission, and/or the like.

When the control channel is located at the last OFDM symbol of the original DL transmission and an UL transmission starts, the one or more WTRUs may use a transmit power indicated in the control channel.

One or more resources may be shared between DL and UL symbols in a self-contained TDD subframe. In a time window (e.g., a TTI), Nsym symbols may be located, used, and/or configured. A first subset of the Nsym symbols may be used for a downlink transmission. A second subset of the Nsym symbols may be used for an uplink transmission. The first subset of the Nsym symbols used for a downlink transmission may be referred to as DL symbols. The second subset of Nsym symbols used for an uplink transmission may be referred to as UL symbols.

The DL symbols and the UL symbols in a time window may be non-overlapped in the time domain.

The DL symbols may be located at the first $N_{DL}$ symbols. The UL symbols may be located at the last $N_{UL}$ symbols.

A symbol which is not a part of DL symbols or UL symbols may be referred to as a guard symbol. Guard symbol, gap, switching time, switching symbol, and DL-UL switching time may be used interchangeably herein.

$N_{DL}$ and/or $N_{UL}$ may be determined based on the location of guard symbol in a time window. One or more guard symbols may be used within a time window. The one or more guard symbols may be located in between DL symbols and UL symbols. The number of guard symbols and/or the location of guard symbol(s) in a time window may be predefined, configured (e.g., via higher layer signaling), and/or indicated (e.g., in a DCI) in one or more DL symbols.

$N_{DL}$ DL symbols may be used for a downlink transmission for a first type of traffic (e.g., normal latency traffic). One or more of the $N_{DL}$ DL symbols may be used for a downlink transmission for a second type of traffic (e.g., low latency traffic). One or more of the following may apply.

The first type of traffic may use $N_{DL}$ DL symbols for downlink data and/or an associated downlink control channel. When the DL data is being sent, the associated downlink control channel may be used to send one or more control information (e.g., where the data are located, which modulation type is used) regarding that DL data. The second type of traffic may use a subset of $N_{DL}$ DL symbols for downlink data and/or an associated downlink control channel. A downlink transmission for the first type of traffic may be punctured, rate-matched, and/or nulled by a downlink transmission for the second type of traffic. The one or more punctured, rate-matched, and/or nulled DL symbols may be indicated to a WTRU. The number of punctured, rate-matched, and/or nulled DL symbols may be indicated in one or more DL symbols (e.g., the $N_{DL}$-th symbol).

A location of one or more guard symbols may be changed (e.g., based on the number of DL symbols used for the second type of traffic). For example, if one DL symbol is used for the second type of traffic and punctured, rate-matched, and/or nulled for the first type of traffic, the time location of guard symbols may be delayed to the number of DL symbols (e.g., one DL symbol) used for the second type of traffic. A number of UL symbols may be reduced based on the number of DL symbols used for the second type of traffic. The number of UL symbols may be reduced based on the number of symbols delayed for the time location of guard symbols. The number of DL symbols may be increased based on the number of symbols used for the second type of traffic. For example, if $N_{SE}$ symbols are used for the second type of traffic in a time window, the number of DL symbols in the time window may be changed to $N_{DL}+N_{SE}$.

The number of DL symbols which may be used for the second type of traffic may be limited to a certain number, such as Nmax. For example, Nmax may be equal to or smaller than $N_{DL}-N_{CL}$. $N_{CL}$ may be referred to as a number of DL symbols used for a downlink control channel. $N_{CL}$ may include '0'. $N_{CL}$ may be a predefined number, configured via higher layer signaling, and/or dynamically indicated in each time window. $N_{CL}$ may be determined based on at least one of $N_{DL}$, $N_{UL}$, and/or the number of symbols within a time window.

A number of symbols used for the gap may be changed based on the number of symbols used for the second type of traffic. For example, $N_{GAP}$ symbols may be determined for guard symbols. $N_{SE}$ symbols may be used for the second type of traffic in a time window. The number of symbols used for the gap may be reduced from $N_{GAP}$ symbols to $N_{GAP}-N_{SE}$ symbols. $N_{GAP}$ and/or $N_{SE}$ may be known to a WTRU. $N_{GAP}$ may be configured (e.g., via higher layer signaling) and/or indicated (e.g., dynamically indicated). $N_{SE}$ may be indicated in one or more DL symbols in the time window (e.g., a known location in $N_{DL}$ DL symbols). A WTRU (e.g., which may be scheduled for uplink transmission in the time window where $N_{SE}$ symbols are used for the second type of traffic) may determine an uplink transmission based on the $N_{GAP}$ and/or $N_{SE}$. If $N_{GAP}-N_{SE}$ is smaller than a predetermined threshold, the WTRU may drop uplink transmission in the time window. For example, if $N_{GAP}-N_{SE}$ is smaller than a timing advance value of a WTRU, the WTRU may drop a scheduled uplink transmission. If $N_{GAP}-N_{SE}$ is smaller than a predetermined threshold, the WTRU may use a first of the one or more UL symbols as a guard symbol.

One or more timing boundaries of a TTI may be changed. The one or more timing boundaries of a TTI may be changed by moving the boundary to a further time instant or an earlier time instant (e.g., to compensate for one or more punctured symbols in a TTI). For example, if m symbols are punctured in a TTI, the TTI may be extended by mT seconds, where m is the number of symbols (e.g., OFDM symbols) punctured and T is the symbol duration. A TTI with one or more changed timing boundaries may be referred to as an elastic TTI.

Figure 22:
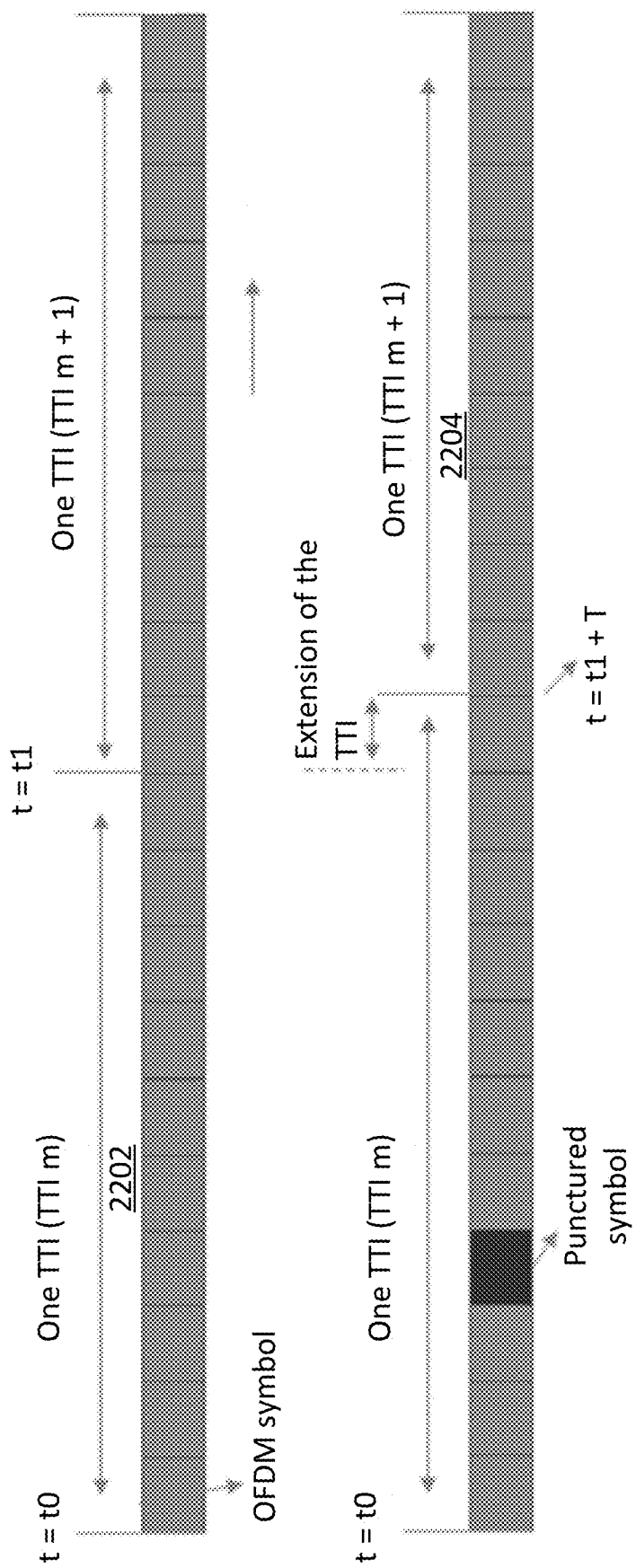
FIG. 22 depicts an example elastic TTI.

FIG. 22 depicts an example elastic TTI. For example, a first TTI (e.g., TTI m) 2202 may have been scheduled to be transmitted within the time t=t0 and t=t1. The duration of the first TTI 2202 may be fixed. The duration of the first TTI 2202 may be equal to 10 T, for example. When one of the symbols in the first TTI is punctured, where the one symbol has duration T, the end point of the TTI may be extended to t=t1+T. The transmission of the first type of traffic may stop during the time when the symbol is punctured. The transmission of the first type of traffic may resume, for example after the puncturing finishes. The duration of the first TTI may increase from, for example 10 T to 10+1=11 T.

When the timing of a TTI is extended, some of the following TTIs may be shortened, for example to maintain the timing of a group of TTIs (e.g., or sub-frames). For example, as shown in FIG. 22, a second TTI (e.g., TTI m+1) 2204 may be shortened by the amount (e.g., same amount) that the first TTI was extended (e.g., so that the total duration of the first and second TTIs is preserved).

A control channel (e.g., an existing control channel or a new control channel) may be defined, modified, etc. For example, the control channel may indicate to one or more WTRUs that a TTI boundary has been extended. The control channel may exist in a pre-defined location. For example, the control channel may exist at the last OFDM symbol of the first TTI.

A transmitter may configure the nominal traffic for a 2 codeword transmission for the TTI following (e.g., immediately following) a punctured TTI (e.g., for increased robustness of the nominal transmission to puncturing from other traffic). One or more of the following may apply.

In TTI #n+1, the transmitter may retransmit (e.g., only retransmit) the nominal data that was punctured in TTI #n (e.g., the punctured RE(s)). In TTI #n+1, the transmission may be configured for 2 codewords transmitted in a time division fashion. A first codeword may carry the nominal data punctured in TTI #n. A second codeword may carry data (e.g., new data), for example, for the nominal traffic in TTI #n+1. The codeword carrying the re-transmission of the punctured RE(s) of TTI #n may be mapped to one or more RE(s) outside the puncturing pattern (e.g., to resources that may not be punctured by other multiplexed traffic).

Nominal (e.g., eMBB) DL re-transmissions may send (e.g., only send) the punctured data. Nominal DL re-transmissions may use the second codeword, time division multiplexed in the same TTI. The TTI following (e.g., immediately following) the punctured TTI, may use the first codeword to retransmit the punctured symbol. A subset (e.g., only a subset) of the OFDM symbol may be punctured by low latency traffic. The subset may be predefined and/or configured. Upon re-transmission of the punctured data using a codeword (e.g., one of the two codeword) in the next TTI, the re-transmission may be mapped to one or more non-puncturable resources.

Multiple code blocks with a cyclic redundancy check (CRC) per code block may be used within the original transport block size (TB S) (e.g., so the re-transmission of nominal traffic only sends the impacted code block).

A channel bandwidth may be divided into two or more partitions. Each of the two or more partitions may be used (e.g., primarily used) for the transmission of a specific type of traffic (e.g., the primary traffic). For example, a first channel may be divided into two partitions. A first partition may be reserved for eMBB traffic. A second partition may be reserved for URLLC traffic. The eMBB traffic may be primary traffic for the first partition. The URLLC traffic may be primary traffic for the second partition.

When the traffic load in one of the two partitions is below a threshold, that partition may be used for the transmission of secondary traffic. Secondary traffic may include a type of traffic other than the primary traffic assigned to the partition. For example, the second partition reserved for URLLC traffic may be used for eMBB traffic (e.g., when URLLC traffic is sporadic). The eMBB may be the secondary traffic on the second partition and the URLLC traffic may be the primary traffic.

Data belonging to the secondary traffic may be encoded (e.g., separately from the primary traffic). For example, the eMBB data may be encoded into two codewords. A first codeword may be transmitted in the first partition and a second codeword may be transmitted in the second partition. The secondary traffic may experience puncturing from the primary traffic associated with that partition (e.g., when URLLC data arrives and has to be transmitted in this partition). The transmitter may use a modulation (e.g., lower modulation) and/or coding scheme for the codeword mapped to the secondary partition (e.g., to improve the reliability of the secondary traffic that may be subject to puncturing from the primary traffic of the secondary partition). For example, a WTRU with an eMBB data to send may receive two codewords, a first codeword in the first partition and a second codeword in the second partition. The second codeword in the second partition may be transmitted with a lower MCS. The secondary traffic may be scheduled for one or more WTRUs that may need low modulation and coding scheme (MCS) transmission (e.g., due to a quality of their channels).

Figure 23:
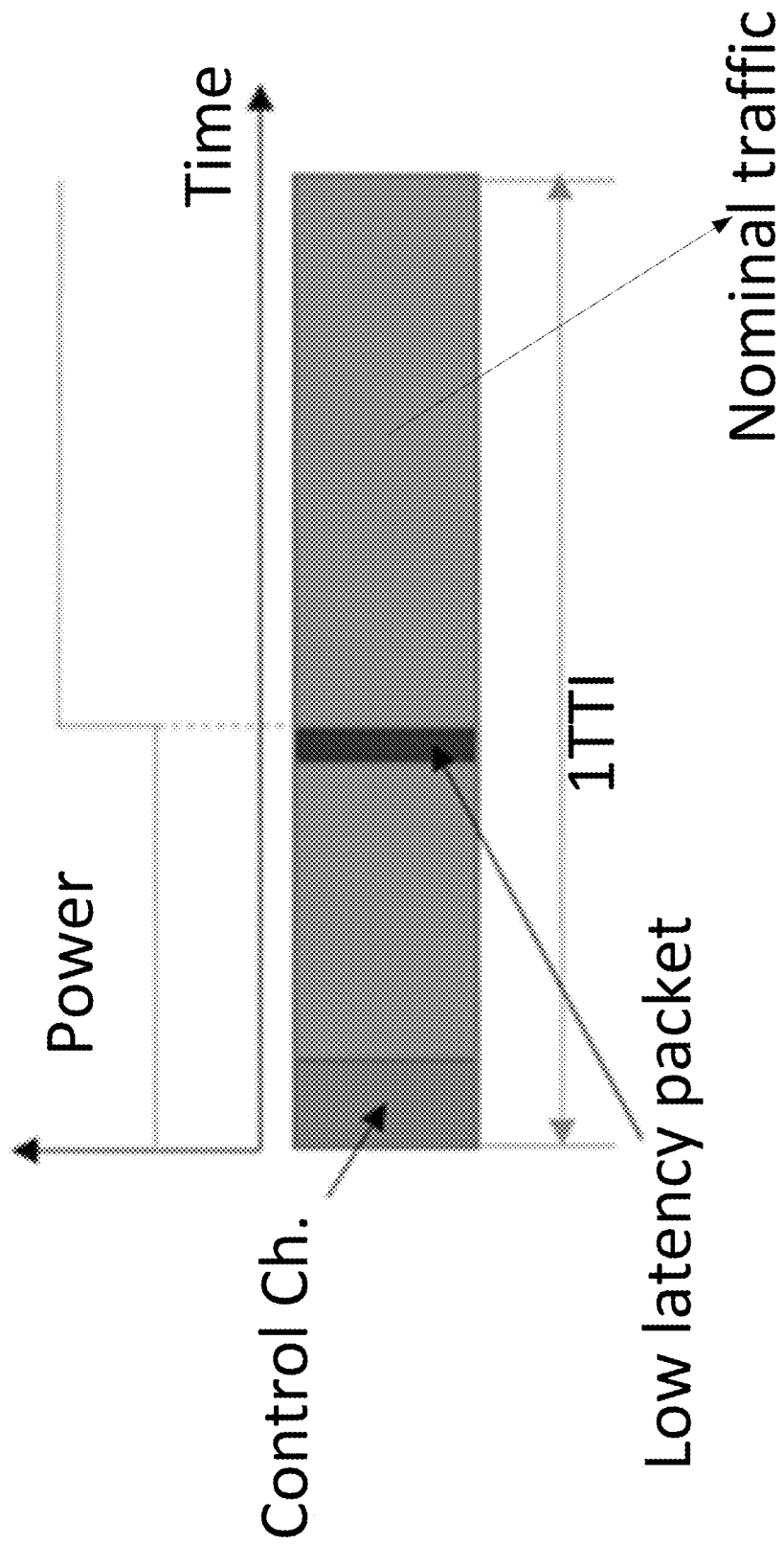
FIG. 23 depicts an example power boosting.

FIG. 23 depicts an example power boosting. For example, a transmitter may increase a transmit power for one or more resources transmitted after puncturing. The transmitter may increase the transmit power, for example to prevent or mitigate the performance loss due to puncturing. As shown in FIG. 23, N subcarriers may be allocated to a WTRU for nominal traffic. If the N subcarriers are punctured during OFDM symbol k, the transmitter may increase the power on the N subcarriers during OFDM symbols k+1, k+2, etc. The transmitter may increase the power to compensate for the loss in the coding rate.

The transmitter may increase the power of the data in the TTI where the low latency packet is inserted (e.g., at a point associated with the low latency packet).

The increased power may be applied to the entire TTI, for example if the transmitter knows in advance a low latency packet may be transmitted in the TTI.

Different numerology may be used to reduce latency. For example, different types of traffic may be transmitted with OFDM symbols. OFDM symbols may have different symbol lengths and/or subcarrier spacing. For example, a first type of traffic may be transmitted on one or more OFDM symbols with symbol duration of T seconds and subcarrier spacing of $\Delta f$ Hz. A second type of traffic may be transmitted on one or more OFDM symbols with symbol duration of T/n seconds and subcarrier spacing of $n\Delta f$ Hz (e.g., where n is a positive integer). Different types of traffic may be mapped to different frequency portions of a channel (e.g., to prevent collisions).

For example, different types of traffic may be transmitted (e.g., transmitted simultaneously) where each of the different types of traffic may be transmitted on OFDM symbols with different symbol durations and/or subcarrier spacing. The transmission of a second type of traffic may include a control channel transmission and/or a data channel transmission. The control channel may include several OFDM symbols. One or more of the several OFDM symbols may be used to transmit a predefined sequence. The remaining OFDM symbols may be used to transmit control data.

Figures 24A, 24B:
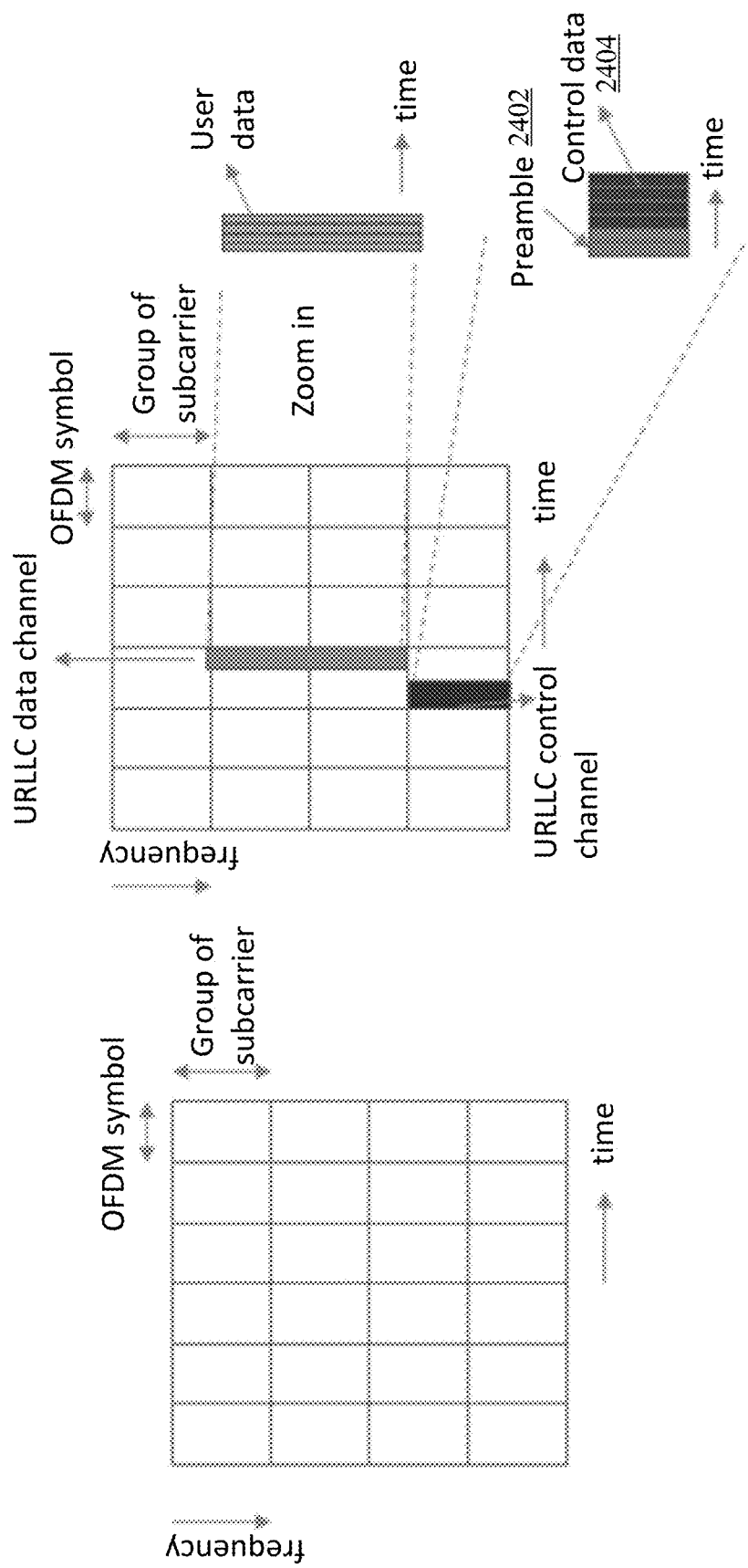
FIGS. 24A and 24B depict an example use of different numerology.

FIGS. 24A and 24B depict an example use of different numerology. For example, FIG. 24A depicts an example time frequency grid that may be used for the transmission of a first type of traffic. FIG. 24B depicts an example transmission of a second type of traffic on some of the time and/or frequency resources. The second type of traffic may include URLLC traffic. A control channel of the URLLC traffic may be transmitted on reserved time and/or frequency resources that may have been configured. The start of a first OFDM symbol of the control channel may align with the start of an OFDM symbol in the time and/or frequency grid of the first type of traffic. The control channel of the URLLC may include a preamble 2402 and/or control data 2404. For example, the preamble 2402 may be followed by the control data 2404. The preamble 2402 and/or the control data 2404 may be detected (e.g., blindly detected) and/or determined (e.g., decoded) by one or more target WTRUs. The control data 2404 may include information about the time and/or frequency resources that have been allocated for the transmission of URLLC traffic. The start of the first OFDM symbol of the URLLC traffic (e.g., regardless whether it carries control and/or user data) within the symbol duration of the time/frequency grid of the first type of traffic may align with the start of an OFDM symbol in the time/frequency grid of the first type of traffic (e.g., aligns with the first OFDM symbol of a TTI of the nominal traffic).

For example, the first type of traffic may provide a reference time/frequency grid. The second type of traffic may use shorter OFDM symbols than the first type of traffic. The first OFDM symbol of the second type of traffic may be aligned with the start of a longer OFDM symbol of the reference time/frequency grid (e.g., first type of traffic).

URLLC data and nominal data (e.g., eMBB) may be multiplexed in an uplink transmission. While one or more first WTRUs are transmitting nominal data (e.g., eMBB data), one or more second WTRUs may receive URLLC data (e.g., from higher layers of the protocol stack). The one or more second WTRUs may need to start transmitting the URLLC data within a time interval (e.g., specified time interval). Due to the latency requirements, the one or more second WTRUs may need to transmit the URLLC data without waiting for a grant. The one or more second WTRUs may select (e.g., autonomously choose) the time and/or frequency resources for the transmission of the URLLC data. If some or all of the selected time and/or frequency resources for the transmission of URLLC data are already being used by other WTRUs, for example by the one or more first WTRUs for the transmission of nominal data such as eMBB data, the transmissions of the URLLC data and the nominal data may interfere with each other (e.g., a collision may occur).

One or more resources (e.g., a pool of resources in time and/or frequency, such as subcarriers and/or symbols) may be allocated for URLLC traffic (e.g., to prevent collisions). A pool of resources allocated for URLLC traffic may not be used for transmission of other types of data (e.g., non-URLLC data). For example, the pool of resources may be reserved (e.g., reserved exclusively) for URLLC traffic. For example, FIG. 25 show various examples of resource pools reserved for URLLC data and/or URLLC reference signals.

Figure 25B:
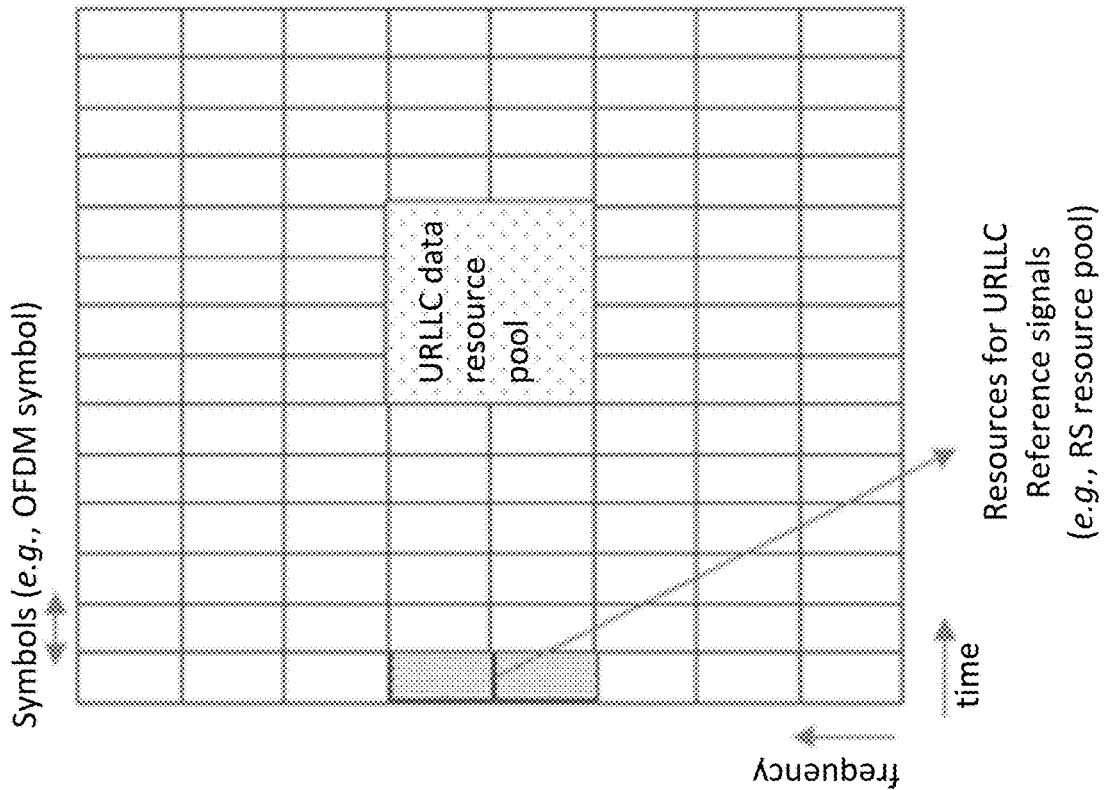
FIGS. 25A-25D depict exemplary resource pools reserved for URLLC data and/or URLLC reference signals.
Figure 25A:
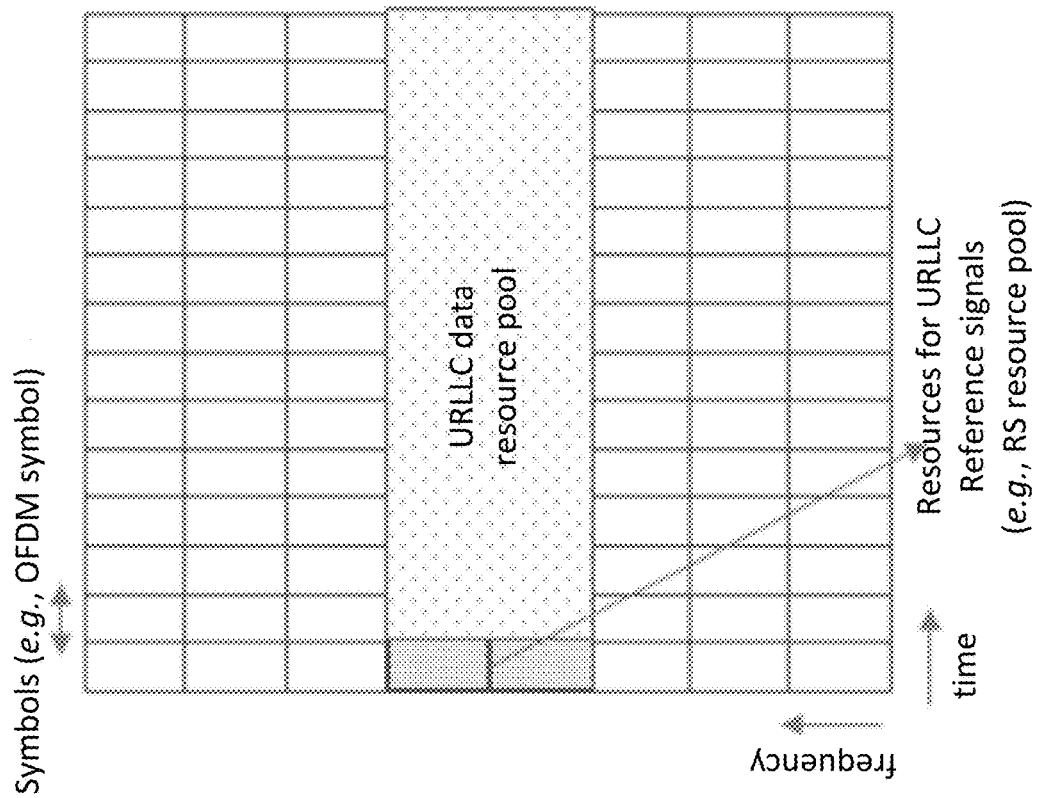
Figures 25C, 25D:
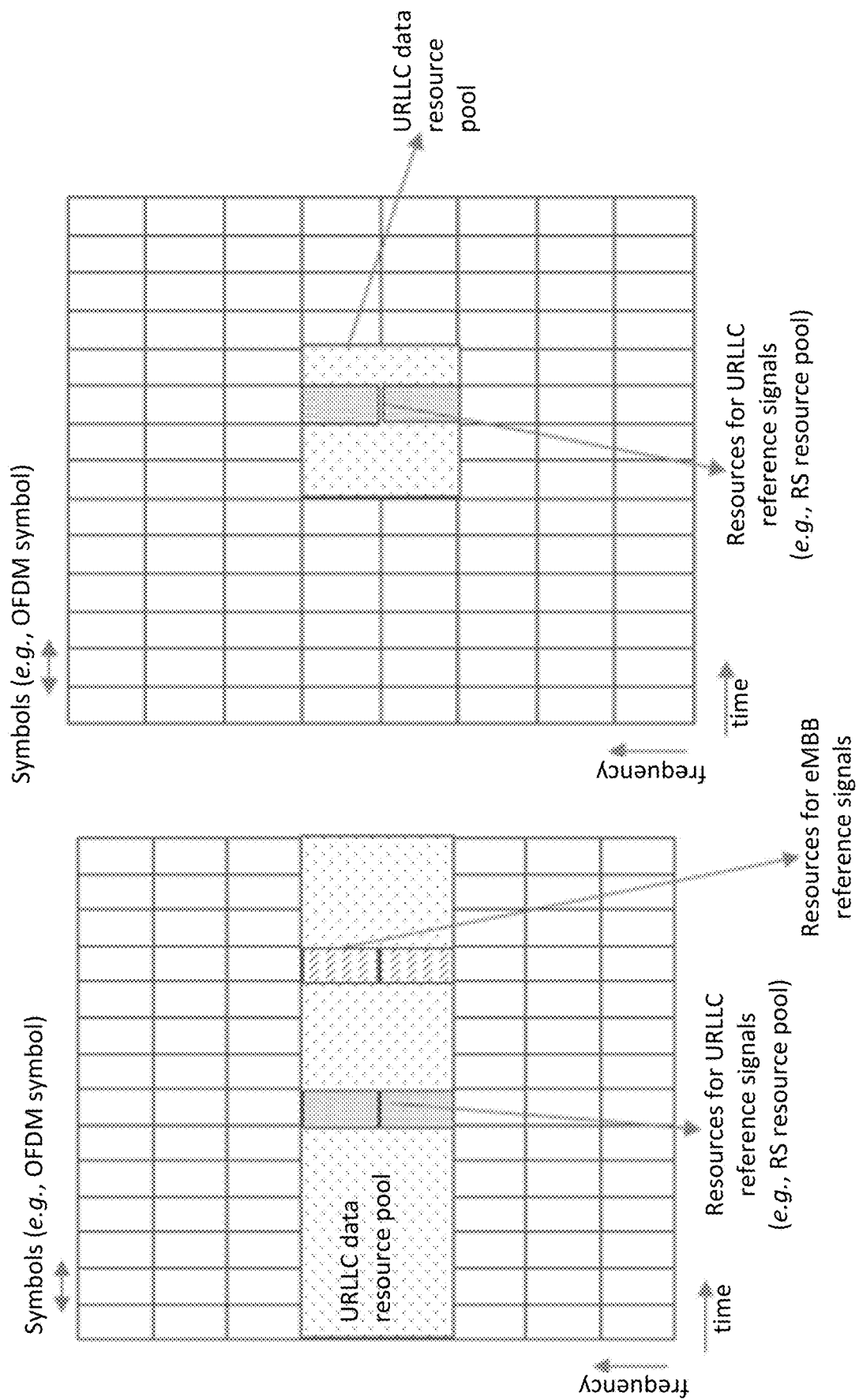

FIGS. 25A-25D depict exemplary resource pools reserved for URLLC data and/or URLLC reference signals. When transmissions from different WTRUs collide, the transmissions may be separated at the receiver (e.g., if the receiver has multiple receive antennas and/or the channel from the transmitting nodes to the receiver can be estimated with a certain reliability). A resource pool may be allocated for the transmission of reference signals by WTRUs transmitting URLLC data. For example, the resources in the resource pool allocated for the transmission of reference signals (e.g., referred to as the RS resource pool) may not be used by WTRUs transmitting other types of data and may be reserved for URLLC RS. For example, the URLLC RS resource pools (e.g., as shown in FIG. 25A) may be used (e.g., exclusively used) for URLLC RS while the URLLC data resource pools may be used for other types of traffic. WTRUs transmitting other types of data may puncture their transmission such that no data symbols may be mapped to the resources reserved for URLLC reference signals. A resource pool may be configured by a central controller, for example a base station. A URLLC resource pool may exclude time and/or frequency resources used for the transmission of reference signals by WTRUs transmitting eMBB data or other types of data. As shown in FIG. 25C, a URLLC data resource pool may include resources for eMBB reference signals. A WTRU transmitting URLLC data may puncture its URLLC transmission and not map data and/or symbols to those resources allocated for eMBB reference signals. One or more puncturing patterns may be configured by a central controller (e.g., a base station).

One or more reference signals for URLLC traffic may be transmitted regardless of whether URLLC data is present. As shown in FIG. 25B, if URLLC data becomes available and/or ready for transmission, data transmission may commence and a receiver may use the previously transmitted reference signals to receive and decode the URLLC data. For example, a URLLC RS may be transmitted by a WTRU with a URLLC data to send. When URLLC data becomes available, the URLLC data may be transmitted in the URLLC data resource pool. When URLLC data does not become available, the URLLC data resource pool may be left unused. If a time interval between the RS and the data transmission is greater than a predetermined threshold, channel estimation accuracy may be degraded. A maximum time interval between the RS transmission and the data transmission may be configured (e.g., by a central controller). A specific RS may be used for the reception of data if the time interval between the RS and a first symbol of the data transmission is equal to or less than n symbols (e.g., a predetermined maximum time interval). A specific RS may be used for the reception of data if the time interval between the RS and a last symbol of the data transmission is equal to or less than m symbols (e.g., a predetermined maximum time interval). One or more maximum time intervals may be configured and/or signaled (e.g., by a central controller).

Figure 26:
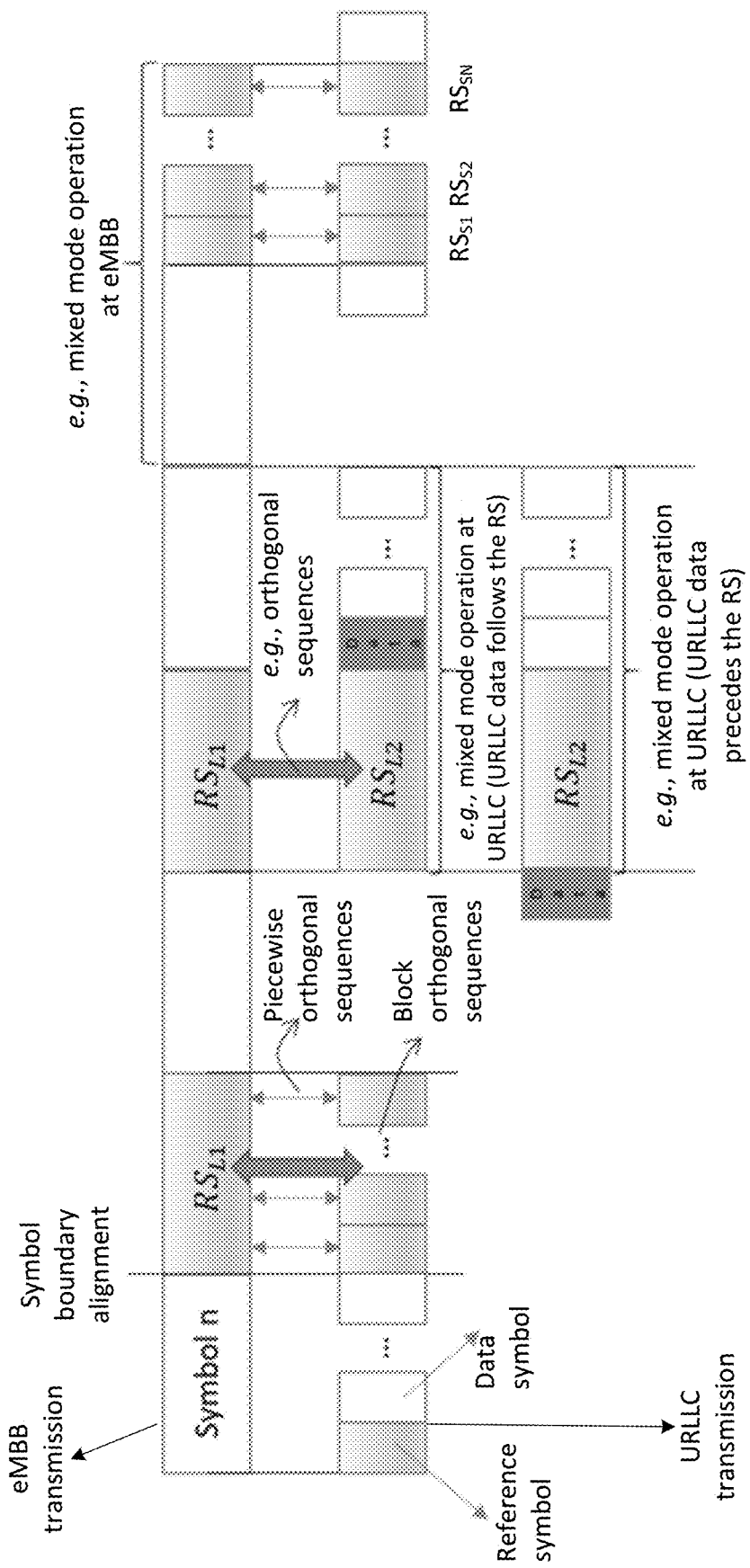
FIG. 26 depicts exemplary URLLC reference symbol (RS) positions relative to an eMBB transmission.

A reference symbol for a low-latency transmission may be aligned with a nominal transmission with a different numerology. For example, a low-latency transmission may be sent in the same OFDM symbol as a nominal transmission with a different numerology. A URLLC transmission may be aligned with an eMBB transmission using a different numerology. A symbol (e.g., such as the OFDM symbol) of a URLLC transmission may be shorter than a symbol of an eMBB transmission while the subcarrier spacing of the URLLC transmission may be larger than the eMBB transmission. During one symbol of an eMBB transmission, a URLLC transmission may include both reference symbol (RS) and data symbol. FIG. 26 depicts exemplary URLLC RS positions relative to an eMBB transmission. As shown in FIG. 26, during symbol n of an eMBB transmission, a URLLC transmission may include both RS symbol and data symbol. A URLLC transmission may puncture the eMBB data, for example, in symbol n. The URLLC traffic and/or the nominal traffic may be assumed to have been generated at different transmission points and/or may be destined for a common receiver.

A symbol boundary alignment may be exploited to achieve channel estimation (e.g., robust channel estimation) for both nominal and low-latency (e.g., URLLC) traffic. For example, the reference symbols of different types of traffic may be aligned in time. One or more of the following may be performed to maintain the orthogonality between the reference symbols of nominal traffic and low latency traffic.

The reference symbols of the nominal traffic and the reference symbols of the low-latency traffic may maintain piece-wise orthogonality and/or block-wise orthogonality. For example, the reference symbols of nominal and low latency traffic may be $RS_{L1}$ and $[RS_{S1}, RS_{S2}, \ldots, RS_{SN}]$, respectively, as shown in FIG. 26. Piece-wise orthogonality may imply that $RS_{Si|i=1, 2, \ldots, N} \perp f(RS_{L1}, i)$, where $f(RS_{L1}, i)$ returns the corresponding part of the $RS_{L1}$ for a given i. Block-wise orthogonality may imply that $RS_{Si|i=1, 2, \ldots, N} \perp RS_{L1}$.

Low-latency and nominal traffic may consider an RS based on a fixed numerology. The fixed numerology may be different than the numerology for the data symbols (e.g., mixed mode operation). A mixed mode operation may include a reference signal design based on low-latency traffic and/or nominal traffic as shown in FIG. 26. URLLC reference signals and reference signals of the nominal traffic may be transmitted on the same symbols (e.g., Discrete Fourier Transforms-Spread OFDM (DFT-s-OFDM) symbols), with the same waveform and/or numerology. The URLLC and nominal traffic reference signals may be orthogonal to each other. The URLLC data may be transmitted with the same waveform as the URLLC RS but with a different numerology. The URLLC RS may be used to decode the URLLC data that precedes and/or follows the RS transmission.

One or more URLLC reference signals may be transmitted with the same waveform and/or numerology as the nominal traffic (e.g., data). For example, the one or more URLLC reference signals may be transmitted with or without a URLLC data transmission preceding (e.g., immediately preceding) and/or following (e.g., immediately following) the URLLC RS transmission. The reference symbols of the URLLC data and the nominal data may align, such that they may be transmitted in the same symbols, for example, the same DFT-s-OFDM symbols. The reference symbols of the URLLC data and the nominal data may be orthogonal to each other, such that reliable channel estimation may be achieved at the receiver. The URLLC data transmission and RS transmission may be separated by a gap (e.g., a time interval of no transmission). The URLLC data may be transmitted with the same numerology as the URLLC RS or with a different numerology. A duration of such a no-transmission gap may be configured and/or controlled by a central controller.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

What is claimed is:

1. A wireless transmit/receive unit (WTRU) comprising:
a processor configured to:
receive a configuration associated with an uplink transmission, wherein the uplink transmission comprises a first traffic type;
monitor for an indication, wherein the indication indicates that the first traffic type is punctured;
determine that the indication is received;
based on the determination that the indication is received, determine a starting symbol of the first traffic type that is punctured based on the indication; and
skip a transmission of the first traffic type from the starting symbol and for all bits assigned to a first traffic type transmission associated with the uplink transmission based on the determination.

2. The WTRU of claim 1, wherein being configured to monitor for the indication comprises being configured to monitor for a control channel.

3. The WTRU of claim 1, wherein the starting symbol is a starting orthogonal frequency-division multiplexing (OFDM) symbol that is punctured to carry a second traffic type.

4. The WTRU of claim 1, wherein the first traffic type is punctured by a second traffic type, wherein the first traffic type is an enhanced Mobile BroadBand (eMBB) traffic type, and the second traffic type is an ultra-reliable and low-latency (URLLC) traffic type.

5. The WTRU of claim 1, wherein the first traffic type is punctured by a second traffic type, wherein the second traffic type is a low-latency traffic type, and wherein the second traffic type has a latency requirement that is shorter than the first traffic type.

6. The WTRU of claim 1, wherein being configured to skip the transmission of the first traffic type comprises being configured to not transmit traffic of the first traffic type.

7. A method comprising:
receiving a configuration associated with an uplink transmission, wherein the uplink transmission comprises a first traffic type;
monitoring for an indication, wherein the indication indicates that the first traffic type is punctured;
determining that the indication is received;
based on the determination that the indication is received, determining a starting symbol of the first traffic type that is punctured based on the indication; and
skipping transmission of the first traffic type from the starting symbol and for all bits assigned to a first traffic type transmission associated with the uplink transmission based on the determination.

8. The method of claim 7, wherein monitoring for the indication comprises monitoring for a control channel.

9. The method of claim 7, wherein the starting symbol is a starting orthogonal frequency-division multiplexing (OFDM) symbol that is punctured to carry a second traffic type.

10. The method of claim 7, wherein the first traffic type is punctured by a second traffic type, wherein the first traffic type is an enhanced Mobile BroadBand (eMBB) traffic type, and the second traffic type is an ultra-reliable and low-latency (URLLC) traffic type.

11. The method of claim 7, wherein the first traffic type is punctured by a second traffic type, wherein the second traffic type is a low-latency traffic type, and wherein the second traffic type has a latency requirement that is shorter than the first traffic type.

12. The method of claim 7, wherein skipping the transmission of the first traffic type comprises canceling traffic of the first traffic type.

13. A wireless transmit/receive unit (WTRU) comprising:
a processor configured to:
receive a configuration associated with an uplink transmission, wherein the uplink transmission comprises a first traffic type;
monitor for an indication, wherein the indication indicates that the first traffic type is punctured;
determine that the indication is received;
based on the determination that the indication is received, determine a starting symbol of the first traffic type that is punctured based on the indication; and
skip a transmission of the first traffic type from the starting symbol and for all remaining bits assigned to a first traffic type transmission associated with the uplink transmission based on the determination.

14. The WTRU of claim 13, wherein the processor being configured to monitor for the indication comprises the processor being configured to monitor for a control channel.

15. The WTRU of claim 13, wherein the starting symbol is a starting orthogonal frequency-division multiplexing (OFDM) symbol that is punctured to carry a second traffic type.

16. The WTRU of claim 13, wherein the first traffic type is punctured by a second traffic type, wherein the first traffic type is an enhanced Mobile BroadBand (eMBB) traffic type, and the second traffic type is an ultra-reliable and low-latency (URLLC) traffic type.

* * * * *